United States Patent
Narumi

(10) Patent No.: US 10,693,396 B2
(45) Date of Patent: Jun. 23, 2020

(54) SEMICONDUCTOR DEVICE, MOTOR DRIVING SYSTEM, AND MOTOR CONTROL PROGRAM

(71) Applicant: RENESAS ELECTRONICS CORPORATION, Tokyo (JP)

(72) Inventor: Satoshi Narumi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/175,458

(22) Filed: Oct. 30, 2018

(65) Prior Publication Data

US 2019/0181783 A1 Jun. 13, 2019

(30) Foreign Application Priority Data

Dec. 8, 2017 (JP) .................................. 2017-235713

(51) Int. Cl.
| | |
|---|---|
| *H02P 6/14* | (2016.01) |
| *H02P 6/182* | (2016.01) |
| *H02M 7/5387* | (2007.01) |
| *H02P 6/28* | (2016.01) |
| *H02P 6/18* | (2016.01) |

(52) U.S. Cl.
CPC ........ *H02P 6/182* (2013.01); *H02M 7/53873* (2013.01); *H02P 6/187* (2013.01); *H02P 6/28* (2016.02)

(58) Field of Classification Search
CPC .................................. H02P 6/182; H02P 6/28
USPC .................................................... 318/400.26
See application file for complete search history.

(56) References Cited

U.S. PATENT DOCUMENTS

| | | | |
|---|---|---|---|
| 2003/0107337 A1* | 6/2003 | Kokami | H02P 6/182 318/400.07 |
| 2005/0067986 A1* | 3/2005 | Kurosawa | G11B 19/28 318/400.35 |
| 2009/0153086 A1* | 6/2009 | Narumi | H02P 6/18 318/400.35 |
| 2012/0200244 A1 | 8/2012 | Otokawa et al. | |
| 2012/0256575 A1* | 10/2012 | Chien | H02P 6/182 318/400.35 |

(Continued)

FOREIGN PATENT DOCUMENTS

JP 2012-165603 A 8/2012

*Primary Examiner* — Erick D Glass
(74) *Attorney, Agent, or Firm* — McDermott Will & Emery LLP

(57) ABSTRACT

To surely detect a back electromotive force generated in a non-conduction phase at an extremely low duty ratio, a motor driving system includes a three-phase motor, an inverter circuit, and a semiconductor device. A controller included in the semiconductor device compares a voltage at an output node corresponding to a non-conduction phase of the inverter circuit and a reference voltage with each other, thereby estimating a position of a rotor of the three-phase motor and generating a pulse width modulation signal based on the estimated position of the rotor. The controller detects the voltage at the output node of the non-conduction phase in a regeneration period of the pulse width modulation signal when a duty ratio of the pulse width modulation signal is less than a threshold value, the regeneration period being a period in which current is made to flow to the three-phase motor on a regeneration path.

15 Claims, 15 Drawing Sheets

(56) References Cited

U.S. PATENT DOCUMENTS

2016/0094168 A1* 3/2016 Maekawa ................ B25F 5/00
    318/400.06
2016/0181956 A1* 6/2016 Wu ........................ H02P 6/182
    318/400.35

* cited by examiner

SEMICONDUCTOR DEVICE, MOTOR DRIVING SYSTEM, AND MOTOR CONTROL PROGRAM

CROSS-REFERENCE TO RELATED APPLICATIONS

The disclosure of Japanese Patent Application No. 2017-235713 filed on Dec. 8, 2017 including the specification, drawings and abstract is incorporated herein by reference in its entirety.

BACKGROUND

The present disclosure relates to a semiconductor device, a motor driving system, and a motor control program and can be suitably used for control of a sensor-less brushless DC motor (also referred to as a permanent magnet synchronous motor), for example.

In sensor-less control of a brushless DC motor, a back electromotive force (BEMF) generated in a stator winding of a non-conduction phase because of rotation of a rotor of the motor is detected, so that a relative position of a magnetic pole pair of the rotor with respect to the stator winding is estimated.

Speed control of such a sensor-less brushless DC motor generally uses PWM (Pulse Width Modulation) control. When the motor is rotated at a high speed in PWM control, a duty ratio (also referred to as a rate of conduction) becomes large. When the motor is rotated at a low speed, the duty ratio becomes low.

However, when the duty ratio is made extremely low to achieve low-speed rotation, a duration of the back electromotive force generated in the stator winding in a non-conduction time period also becomes extremely short, thus making detection of the back electromotive force difficult. This is because, as an on-time becomes shorter than a delay time of a control signal of a motor control circuit, setting of a timing of reading the back electromotive force becomes difficult.

Japanese Unexamined Patent Application Publication No. 2012-165603 deals with the above problem. Specifically, a motor driving device described in this document makes a PWM frequency smaller in a stepwise manner with reduction of a rotation speed of a motor. This driving makes an on-time longer in a case of low-speed rotation, thus enabling reading of a back electromotive force.

SUMMARY

In recent years, the performance of brushless DC motors is being improved, and a brushless DC motor with sensor can be controlled even at a duty ratio of near 0%. Therefore, it is demanded that a sensor-less brushless DC motor also has the same or similar performance as/to the brushless DC motor with sensor. In this case, it is desirable that the limit on a PWM frequency, for example, described in Japanese Unexamined Patent Application Publication No. 2012-165603, is not present.

Other objects and novel features will be apparent from the description of this specification and the accompanying drawings.

A semiconductor device according to an embodiment is configured to detect a back electromotive force generated in a non-conduction phase in a regeneration period of a pulse width modulation signal, when a duty ratio of the pulse width modulation signal output to an inverter circuit for driving the three-phase motor is less than a threshold value. The regeneration period is a period in which current is made to flow to a three-phase motor on a regeneration path.

According to the above embodiment, the back electromotive force generated in the non-conduction phase can be surely detected even at an extremely low duty ratio.

DETAILED DESCRIPTION

Figure 1:
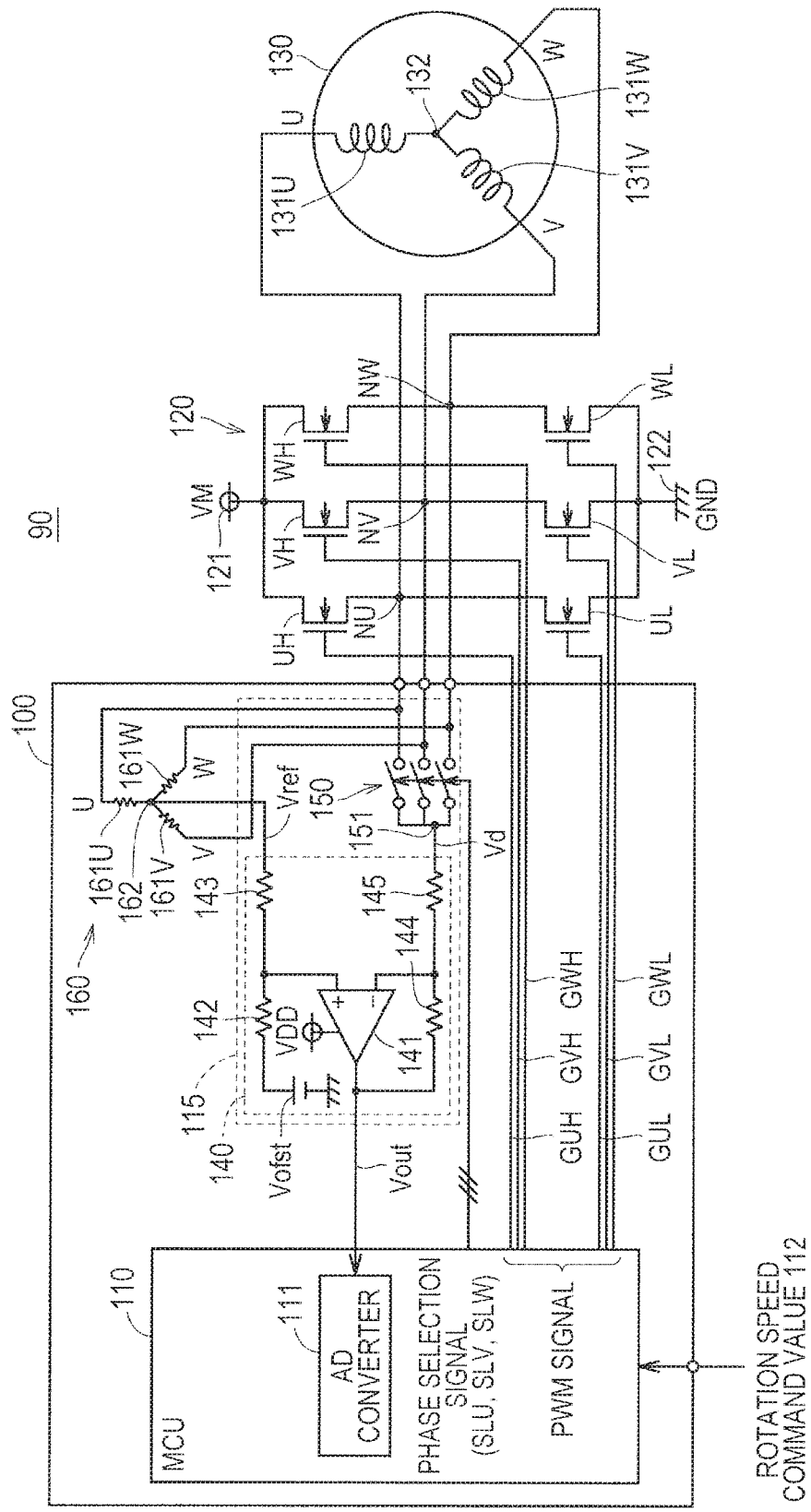
FIG. 1 is a block diagram illustrating a configuration example of a motor driving system.

Embodiments are described in detail below referring to the drawings. The same or corresponding portions are labeled with the same reference sign, and the description thereof is not repeated.

First Embodiment

[Overall Configuration of Motor Driving System]

FIG. 1 is a block diagram illustrating a configuration example of a motor driving system. Referring to FIG. 1, a motor driving system 90 includes a three-phase brushless DC motor 130, an inverter circuit 120, and a semiconductor device 100 that controls the inverter circuit 120.

(1. Brushless DC Motor)

The brushless DC motor 130 includes stator windings 131U, 131V, and 131W in Y-connection and a rotor (not illustrated) having one or more magnetic pole pairs. The rotor is driven to rotate in synchronization with three-phase alternating current supplied from the inverter circuit 120 to the stator windings 131U, 131V, and 131W. A node of the stator windings 131U, 131V, and 131W is called a midpoint 132.

(2. Inverter Circuit)

The inverter circuit 120 includes a MOS (Metal Oxide Semiconductor) transistor UH for U-phase upper arm, a MOS transistor UL for U-phase lower arm, a MOS transistor VH for V-phase upper arm, a MOS transistor VL for V-phase lower arm, a MOS transistor WH for W-phase upper arm, and a MOS transistor WL for W-phase lower arm. An upper arm and a lower arm may be referred to as a high side and a low side, respectively. Coupling of these transistors is now described briefly.

The MOS transistor UH and the MOS transistor UL are coupled in that order between a first power-supply node 121 that provides power-supply voltage VM and a second power-supply node 122 that provides ground voltage GND. An output node NU, which is a coupling point between the MOS transistor UH and the MOS transistor UL, is coupled to one end of the U-phase stator winding 131U.

Similarly, the MOS transistor VH and the MOS transistor VL are coupled in series in that order between the first power-supply node 121 and the second power-supply node 122. An output node NV, which is a coupling point between the MOS transistor VH and the MOS transistor VL, is coupled to one end of the V-phase stator winding 131V. The MOS transistor WH and the MOS transistor WL are coupled in series in that order between the first power-supply node 121 and the second power-supply node 122. An output node NW, which is a coupling point between the MOS transistor WH and the MOS transistor WL, is coupled to one end of the W-phase stator winding 131W.

Each of the MOS transistors UH, UL, VH, VL, WH, and WL includes a body diode (not illustrated) coupled in parallel in a reverse bias direction. Therefore, when both an upper-arm transistor and a lower-arm transistor of the same phase are off, current may flow through these body diodes on a regeneration path.

In FIG. 1, all the MOS transistors UH, UL, VH, VL, WH, and WL are configured by N channel MOS transistors. Alternatively, either the upper-arm MOS transistors UH, VH, and WH or the lower-arm MOS transistors UL, VL, and WL can be configured by N channel MOS transistors, while the other can be configured by P channel MOS transistors. Further, all the MOS transistors UH, UL, VH, VL, WH, and WL can be configured by P channel MOS transistors.

Furthermore, as a semiconductor switching element forming the inverter circuit 120, the MOS transistor can be replaced by another type of field effect transistor, a bipolar transistor, or an IGBT (Insulated Gate Bipolar Transistor), for example. However, in a case of using another type of transistor, it is necessary to couple a freewheeling diode in antiparallel to each transistor for making current flow on the regeneration path when both an upper-arm transistor and a lower-arm transistor of the same phase are off.

(3. Semiconductor Device)

The semiconductor device 100 includes a switch circuit 150, a virtual midpoint generation circuit 160, a differential amplifier circuit 140, and a microcontroller unit (MCU) 110. The switch circuit 150 and the differential amplifier circuit 140 configure a detector 115 for detecting a voltage at an output node of a non-conduction phase of the inverter circuit 120.

The switch circuit 150 is coupled to the output nodes NU, NV, and NW. The switch circuit 150 couples an output node of a selected phase among the output nodes NU, NV, and NW and a detection node 151 to each other in accordance with phase selection signals SLU, SLV, and SLW output from the MCU 110.

The virtual midpoint generation circuit 160 provides a virtual midpoint 162 that has the same voltage as that at the midpoint 132 of the brushless DC motor 130. Specifically, the virtual midpoint generation circuit 160 includes a resistance element 161U coupled between the virtual midpoint 162 and the output node NU, a resistance element 161V coupled between the virtual midpoint 162 and the output node NV, and a resistance element 161W coupled between the virtual midpoint 162 and the output node NW. The resistance elements 161U, 161V, and 161W have mutually equal resistance values.

The differential amplifier circuit 140 amplifies a difference between a voltage Vd at the detection node 151 and a reference voltage Vref. A voltage at the midpoint 132 or the virtual midpoint 162 is used as the reference voltage Vref.

As an example of a specific circuit configuration, the differential amplifier circuit 140 includes an operational amplifier 141 and resistance elements 142, 143, 144, and 145, as illustrated in FIG. 1. The resistance element 143 is coupled between the virtual midpoint 162 and a positive terminal of the operational amplifier 141. One end of the resistance element 142 is coupled to the positive terminal of the operational amplifier 141, and an offset voltage Vofst is provided to the other end. The resistance element 145 is coupled between the detection node 151 and a negative terminal of the operational amplifier 141. The resistance element 144 is coupled between the negative terminal of the operational amplifier 141 and an output terminal.

In the above-described circuit configuration, it is assumed that the voltage at the detection node 151 is Vd, the voltage at the virtual midpoint 162 is Vref, a resistance value of the resistance elements 143 and 145 is R1, and a resistance value of the resistance elements 142 and 144 is R2. An output voltage Vout of the operational amplifier 141 is then represented in the following expression.

$$Vout = (Vref - Vd) \times R2/R1 + Vofst \quad (1)$$

Thus, by setting a power-supply voltage of the operational amplifier 141 to VDD [V] and setting the offset voltage Vofst to VDD/2, the output voltage of the operational amplifier 141 varies in a range of 0 to VDD [V], and is equal to VDD/2 when the voltage Vd at the detection node 151 is equal to the voltage Vref at the virtual midpoint 162.

The MCU 110 is a computer including a CPU (Central Processing Unit) and a memory, for example, incorporated into one integrated circuit. The MCU 110 implements various functions described in this specification by executing a program stored in the memory. The MCU 110 further includes an AD (Analog to Digital) converter 111 and converts an output of the differential amplifier circuit 140 to a digital value.

The MCU 110 generates PWM signals GUH, GUL, GVH, GVL, GWH, and GWL based on a detection value of a motor current by a shunt resistor (not illustrated), an estimated position of a rotor based on the output of the differential amplifier circuit 140, and a control command value, such as a rotation speed command value 112. The MCU 110 outputs the generated PWM signals GUH, GUL, GVH, GVL, GWH, and GWL to gates of the MOS transistors UH, UL, VH, VL, WH, and WL that configure the inverter circuit 120, respectively. The MCU 110 further generates phase selection signals SLU, SLV, and SLW for switching the switch circuit 150 based on the generated GUH, GUL, GVH, GVL, GWH, and GWL.

[Conduction Patterns in 120° Conduction Method]

In the present embodiment, the MCU 110 controls the brushless DC motor 130 by the 120° conduction method. The 120° conduction method is a method in which a period of 120° in a half cycle of an electrical angle is used as a conduction period and the remaining period of 60° is used as a non-conduction period. In the non-conduction period, a back electromotive force appears. For a three-phase brushless DC motor, a conduction phase is switched every electrical angle of 60°, and therefore there are six conduction patterns.

Also in a case where a period in the half cycle of the electrical angle, in which the electrical angle is 120° or more and is smaller than 180°, is set as a conduction period, the technique of the present disclosure can be applied as long as a back electromotive force generated in a non-conduction period can be measured.

Note that the conduction period and the non-conduction period of the above-described 120° conduction method refer to different periods from a conduction period and a regeneration period in PWM control be described later. In this specification, in a case where it is necessary to clearly distinguish the conduction period and the non-conduction period in the 120° method and the conduction period and the regeneration period in PWM control from each other, the conduction period and the non-conduction period in the 120° conduction method are referred to as an on-period and an off-period, respectively.

FIGS. 2A to 2C and 3A to 3C are explanatory diagrams of six conduction patterns in a 120° conduction method.

Figure 2A:
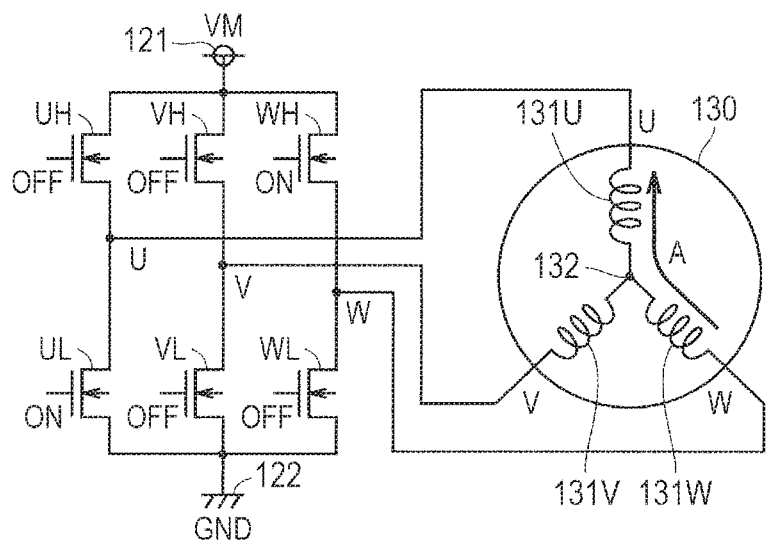
FIGS. 2A to 2C are explanatory diagrams of six conduction patterns in a 120° conduction method (part 1).

Referring to FIG. 2A, when the W-phase upper-arm MOS transistor WH and the U-phase lower-arm MOS transistor UL in the inverter circuit 120 are controlled to be on and the other transistors are controlled to be off, a motor current A flows from the W-phase stator winding 131W to the U-phase stator winding 131U. The V-phase stator winding 131V is in a non-conduction state, and a back electromotive force appears. This conduction pattern is referred to as a conduction pattern A in the following description.

Further, in the conduction pattern A, the V-phase is referred to as a "non-conduction phase", the W-phase is referred to as an "upstream conduction phase", and the U-phase is referred to as a "downstream conduction phase". A motor current flows from the stator winding of the upstream conduction phase to the stator winding of the downstream conduction phase. Similar definition is also applied to other conduction patterns.

Figure 2B:
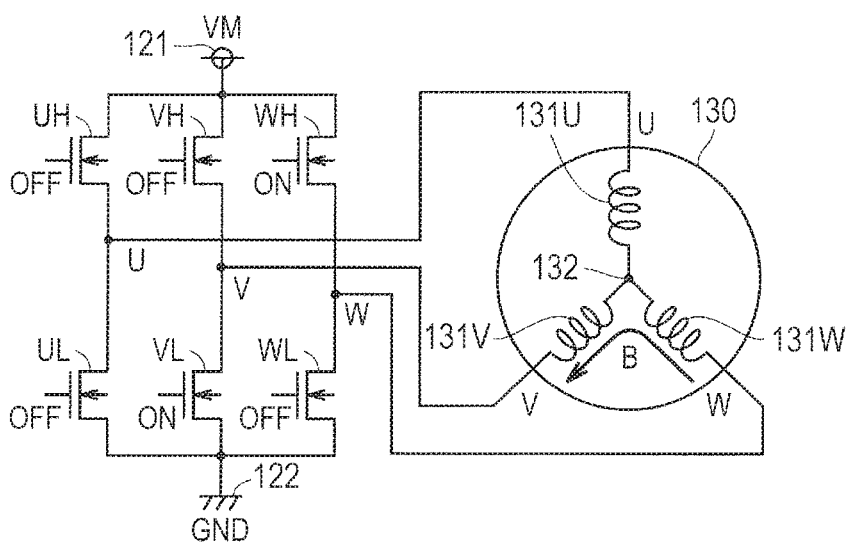

Referring to FIG. 2B, when the W-phase upper-arm MOS transistor WH and the V-phase lower-arm MOS transistor VL are controlled to be on and the other transistors are controlled to be off, a motor current B flows from the W-phase stator winding 131W to the V-phase stator winding 131V. The U-phase stator winding 131U is in a non-conduction state, and a back electromotive force appears. This conduction pattern is referred to as a conduction pattern B in the following description.

Figure 2C:
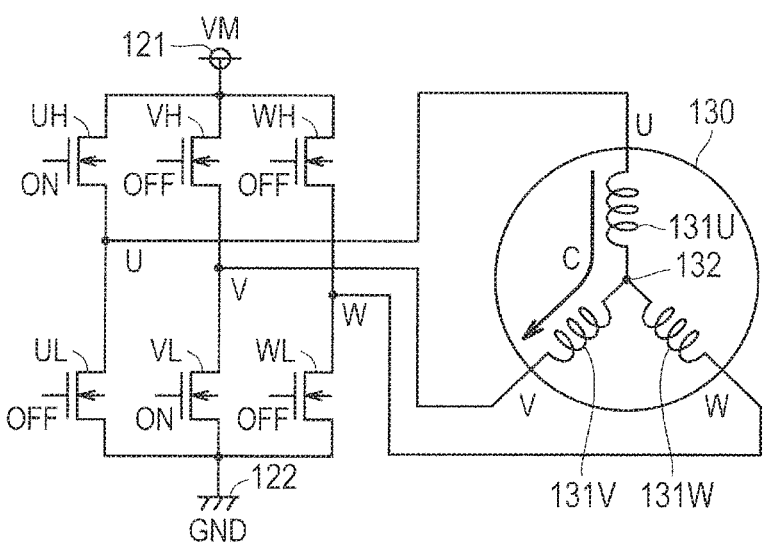

Referring to FIG. 2C, when the U-phase upper-arm MOS transistor UH and the V-phase lower-arm MOS transistor VL are controlled to be on and the other transistors are controlled to be off, a motor current C flows from the U-phase stator winding 131U to the V-phase stator winding 131V. The W-phase stator winding 131W is in a non-conduction state, and a back electromotive force appears. This conduction pattern is referred to as a conduction pattern C in the following description.

Figure 3A:
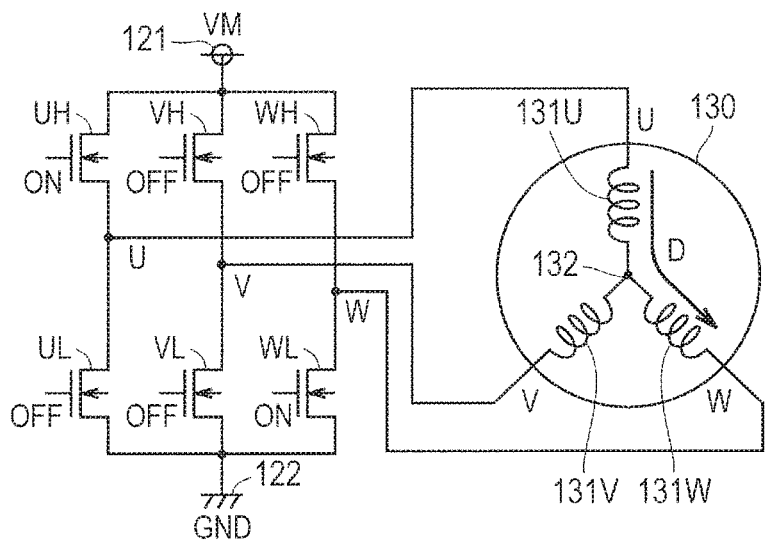
FIGS. 3A to 3C are explanatory diagrams of the six conduction patterns in the 120° conduction method (part 2).

Referring to FIG. 3A, when the U-phase upper-arm MOS transistor UH and the W-phase lower-arm MOS transistor WL are controlled to be on and the other transistors are controlled to be off, a motor current D flows from the U-phase stator winding 131U to the W-phase stator winding 131W. The V-phase stator winding 131V is in a non-conduction state, and a back electromotive force appears. This conduction pattern is referred to as a conduction pattern D in the following description.

Figure 3B:
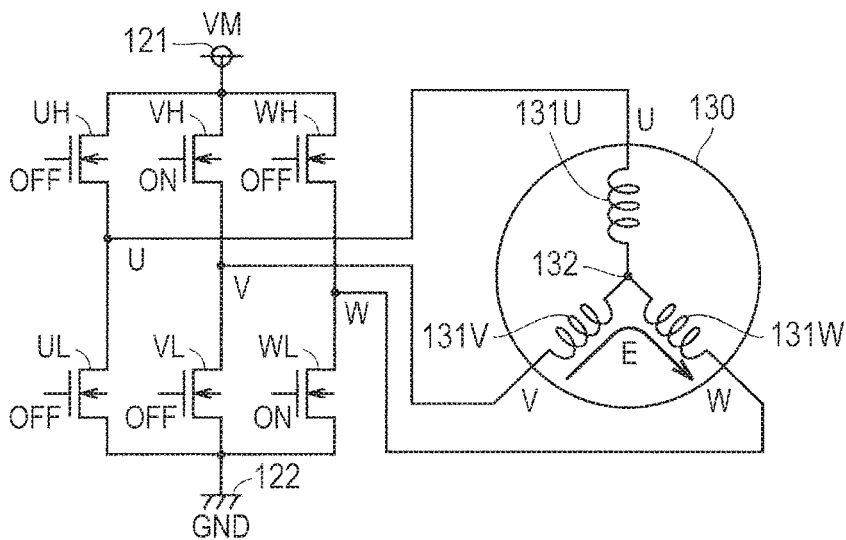

Referring to FIG. 3B, when the V-phase upper-arm MOS transistor VH and the W-phase lower-arm MOS transistor WL are controlled to be on and the other transistors are controlled to be off, a motor current E flows from the V-phase stator winding 131V to the W-phase stator winding 131W. The U-phase stator winding 131U is in a non-conduction state, and a back electromotive force appears. This conduction pattern is referred to as a conduction pattern E in the following description.

Figure 3C:
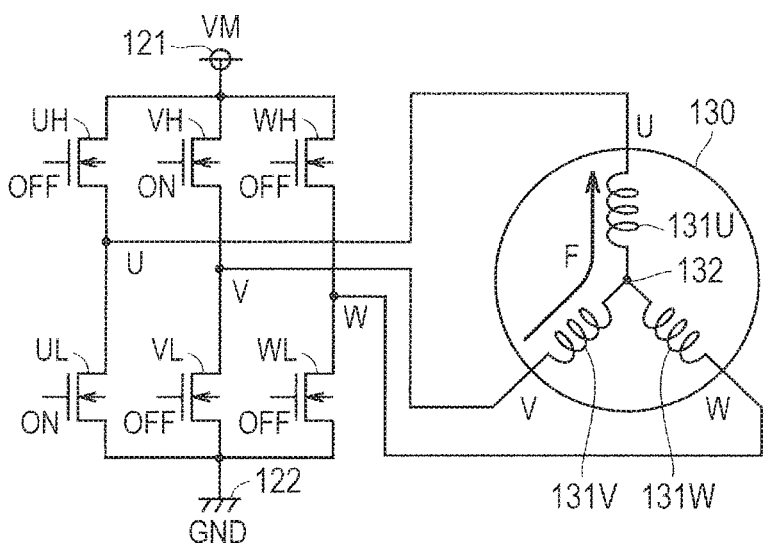

Referring to FIG. 3C, when the V-phase upper-arm MOS transistor VH and the U-phase lower-arm MOS transistor UL are controlled to be on and the other transistors are controlled to be off, a motor current F flows from the V-phase stator winding 131V to the U-phase stator winding 131U. The W-phase stator winding 131W is in a non-conduction state, and a back electromotive force appears. This conduction pattern is referred to as a conduction pattern F in the following description.

When the inverter circuit 120 is controlled in such a manner that current is made to flow in the brushless DC motor 130 in the above-described conduction patterns A, B, C, D, E, and F in that order, a conduction phase is switched in the order of the U-phase, the V-phase, the W-phase, and the U-phase, . . . , sequentially. Therefore, a rotor of the brushless DC motor 130 also rotates in synchronization with this rotating electromagnetic field. In this specification, this rotation direction is referred to as a forward direction for convenience.

Meanwhile, when the inverter circuit 120 is controlled in such a manner that current is made to flow in the brushless DC motor 130 in the reverse order to the above-described order, that is, in the conduction patterns F, E, D, C, B, and A in that order, the conduction phase is switched in the order of the W-phase, the V-phase, the U-phase, and the W-phase, . . . sequentially. Therefore, the rotor of the brushless DC motor 130 also rotates in synchronization with this rotating electromagnetic field. In this specification, this rotation direction is referred to as a reverse direction for convenience.

[Current and Voltage in Stator Winding in PWM Control]

Next, description is provided for current that flows in a stator winding 131 of a conduction phase and a back electromotive force generated in a stator winding 131 of a non-conduction phase, in a case where the brushless DC motor 130 of the 120° conduction method is PWM-controlled.

Figure 4A:
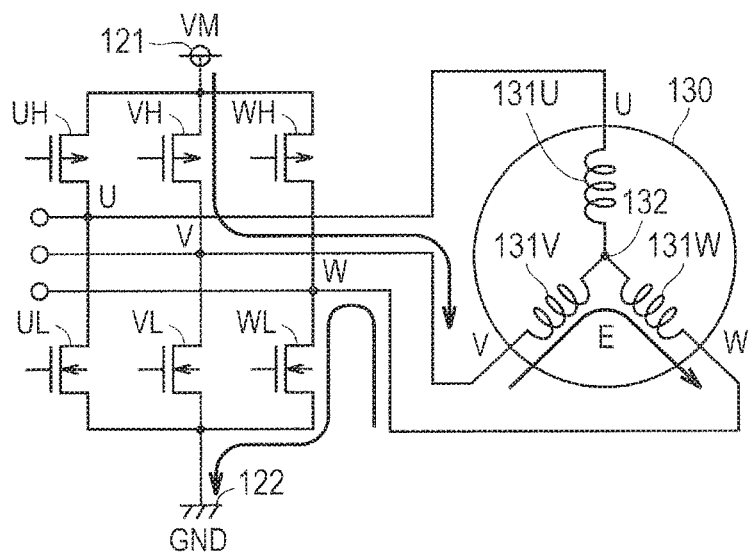
FIGS. 4A to 4C illustrate a flow of motor current in the conduction pattern illustrated in FIG. 3B when a brushless DC motor 130 is PWM-driven.
Figure 4B:
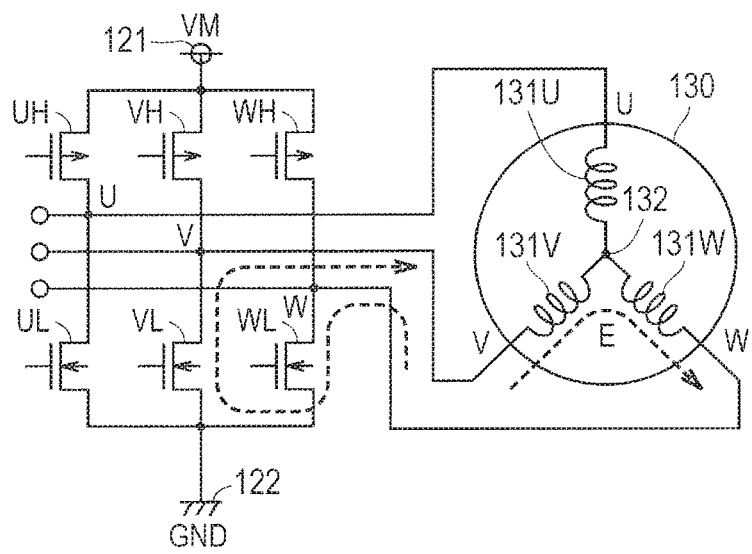
Figure 4C:
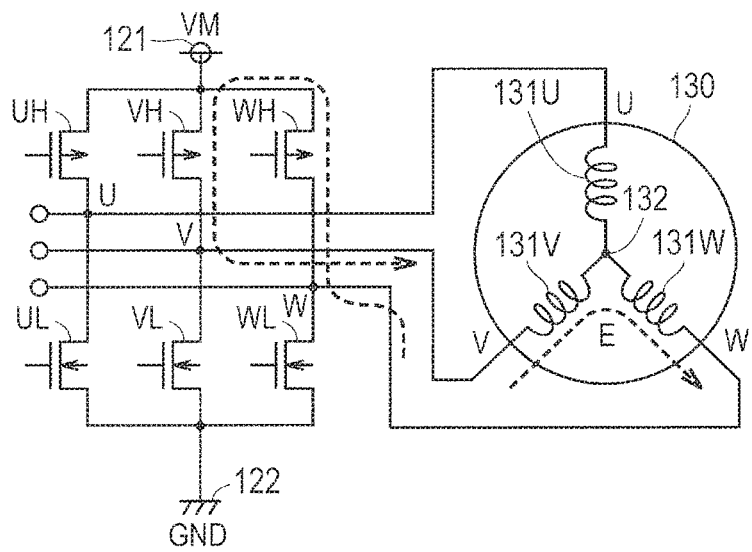

FIGS. 4A to 4C illustrate a flow of a motor current in the conduction pattern illustrated in FIG. 3B when the brushless DC motor 130 is PWM-driven. In the conduction pattern E illustrated in FIGS. 4A to 4C, the U-phase is a non-conduction phase, the V-phase is an upstream conduction phase, and the W-phase is a downstream conduction phase. A motor current flows from the V-phase stator winding 131V of the upstream conduction phase to the W-phase stator winding 131W of the downstream conduction phase.

In PWM control, two periods are repeated. In one of the period, the power-supply voltage VM is supplied to the brushless DC motor 130 to cause current to flow on a conduction path, as illustrated in FIG. 4A. In the other period, current flows on a regeneration path, as illustrated in FIG. 4B or 4C. In this specification, the former period is referred to as a "conduction period" and the latter period is referred to as a "regeneration period".

FIG. 4A illustrates a flow of a motor current in a case where both the V-phase upper-arm MOS transistor VH and the W-phase lower-arm MOS transistor WL, the V-phase and the W-phase being conduction phases, are on (the conduction period), that is, a power-supply voltage is supplied to the brushless DC motor 130. Specifically, the motor current flows through the first power-supply node 121 to which the power-supply voltage VM is provided, the MOS transistor VH, the V-phase stator winding 131V, the midpoint 132, the W-phase stator winding 131W, the MOS transistor WL, and the second power-supply node 122 to which the ground voltage GND is provided, in that order, as illustrated in FIG. 4A.

FIG. 4B illustrates a case where the MOS transistor VH of the V-phase upper-arm MOS transistor VH and the W-phase lower-arm MOS transistor WL, the V-phase and the W-phase being conduction phases, is off and the V-phase lower-arm MOS transistor VL is on (the regeneration period). In this case, current flows on the regeneration path that circulates through the V-phase stator winding 131V, the midpoint 132, the W-phase stator winding 131W, the MOS transistor WL, and the MOS transistor VL in that order, as illustrated in FIG. 4B.

In this manner, in FIG. 4B, current flows to lower-arm switching elements of the inverter circuit 120 on the regeneration path. In this specification, this control mode is referred to as a "lower-arm regeneration mode". In the lower-arm regeneration mode, it is possible to control the inverter circuit 120 to cause the conduction period and the lower-arm regeneration period to alternately appear by switching on/off of the V-phase MOS transistors VH and VL of the upstream conduction phase.

FIG. 4C illustrates a case where the MOS transistor WL of the V-phase upper-arm MOS transistor VH and the W-phase lower-arm MOS transistor WL, the V-phase and the W-phase being conduction phases, is off and the W-phase upper-arm MOS transistor WH is on (the regeneration period). In this case, current flows on the regeneration path that circulates through the V-phase stator winding 131V, the midpoint 132, the W-phase stator winding 131W, the MOS transistor WH, and the MOS transistor VH in that order, as illustrated in FIG. 4C.

In this manner, in FIG. 4C, current flows to upper-arm switching elements of the inverter circuit 120 on the regeneration path. In this specification, this control mode is referred to as an "upper-arm regeneration mode". In the upper-arm regeneration mode, it is possible to control the inverter circuit 120 to cause the conduction period and the upper-arm regeneration period to alternately appear by switching on/off of the W-phase MOS transistors WH and WL of the downstream conduction phase.

In the following description, a case of using the "lower-arm regeneration mode" will be described in the first embodiment, and a case of using both the "upper-arm regeneration mode" and the "lower-arm regeneration mode" will be described in a second embodiment. Note that it is also possible to perform PWM control using the "upper-arm regeneration mode" only.

Figure 5A:
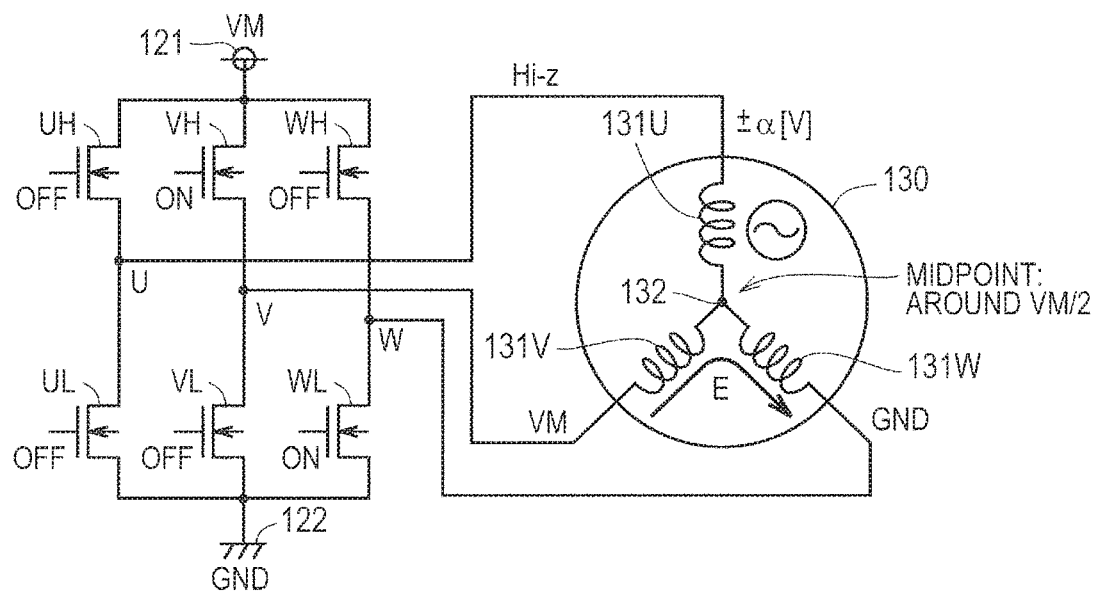
FIGS. 5A and 5B are explanatory diagrams of a back electromotive force generated in the brushless DC motor in the conduction pattern illustrated in FIG. 3B when the brushless DC motor 130 is PWM-driven.
Figure 5B:
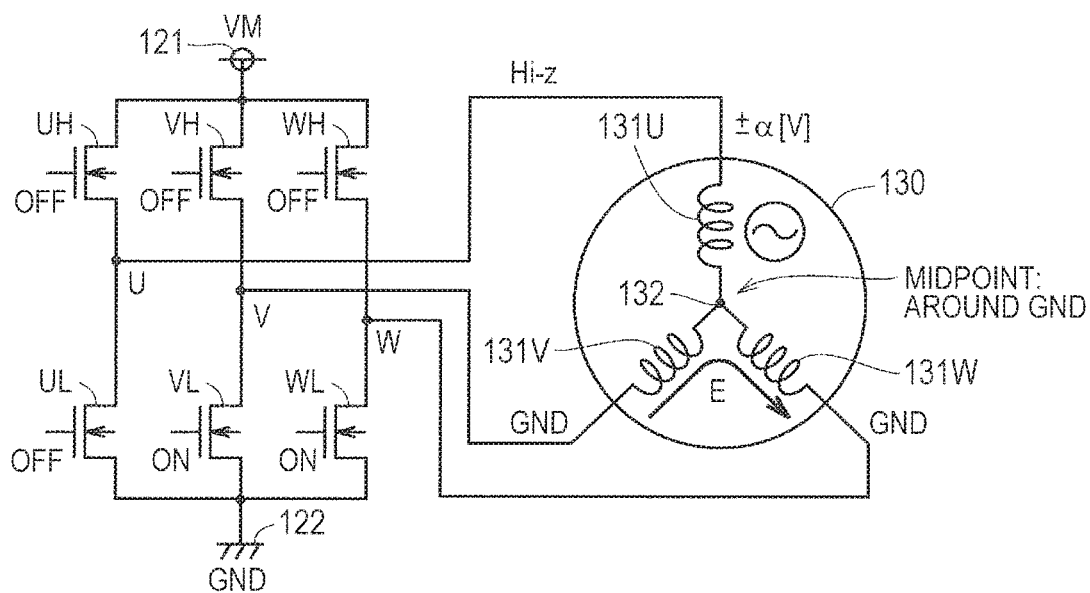

FIGS. 5A and 5B are explanatory diagrams of a back electromotive force generated in the brushless DC motor in the conduction pattern illustrated in FIG. 3B when the brushless DC motor 130 is PWM-driven.

FIG. 5A illustrates a voltage generated at the midpoint 132 and a back electromotive force generated in the stator winding 131U of the U-phase that is a non-conduction phase in a conduction period corresponding to FIG. 4A.

As illustrated in FIG. 5A, the midpoint 132 is coupled to the first power-supply node 121 (the power-supply voltage VM) via the V-phase stator winding 131V and the MOS transistor VH that is on, and is coupled to the second power-supply node 122 (the ground voltage GND) via the W-phase stator winding 131W and the MOS transistor WL that is on. Therefore, a voltage of around VM/2 is applied to the midpoint 132. Note that the voltage at the midpoint 132 does not become completely equal to VM/2 since a back electromotive force is also generated in the stator windings 131V and 131W of conduction phases in accordance with a position of a rotor.

Meanwhile, the stator winding 131U of the U-phase that is the non-conduction phase is not coupled to any of the power-supply nodes 121 and 122, and has high impedance (Hi-Z). In this case, a voltage of about VM/2±α [V] is generated in the stator winding 131. The voltage α is a back electromotive force generated in accordance with a position of a rotor. Therefore, it is possible to estimate the position of the rotor based on a voltage difference (±α) between the output node NU of the U-phase of the inverter circuit 120 and the midpoint 132 of the brushless DC motor 130. Note that in the motor driving system 90 of the present embodiment, a voltage at the virtual midpoint 162 in FIG. 1 is used in place of the voltage at the midpoint 132.

FIG. 5B illustrates a voltage generated at the midpoint 132 and a back electromotive force generated in the stator winding 131U of the U-phase that is a non-conduction phase in a lower-arm regeneration period corresponding to FIG. 4B.

As illustrated in FIG. 5B, the midpoint 132 is coupled to the second power-supply node 122 (the ground voltage GND) via the V-phase stator winding 131V and the MOS transistor VL that is on, and is coupled to the second power-supply node 122 (the ground voltage GND) via the W-phase stator winding 131W and the MOS transistor WL that is on. Therefore, a voltage of around the ground voltage GND is applied to the midpoint 132. Note that the voltage at the midpoint 132 does not become completely equal to the ground voltage GND since a back electromotive force is also generated in the stator windings 131V and 131W of conduction phases in accordance with a position of a rotor.

Meanwhile, a voltage of about GND±α [V] is generated in the stator winding 131U of the U-phase that is a non-conduction phase. The voltage α is a back electromotive force generated in accordance with a position of a rotor. Therefore, it is possible to estimate the position of the rotor based on a voltage difference (±α) between the output node NU of the U-phase of the inverter circuit 120 and the midpoint 132 of the brushless DC motor 130. Note that in the motor driving system 90 of the present embodiment, a voltage at the virtual midpoint 162 in FIG. 1 is used in place of the voltage at the midpoint 132.

[Outline of Motor Driving Control]

Next, the outline of a procedure of driving and controlling the motor driving system 90 illustrated in FIG. 1 is described, with reference to schematic motor current waveforms.

Figure 6:
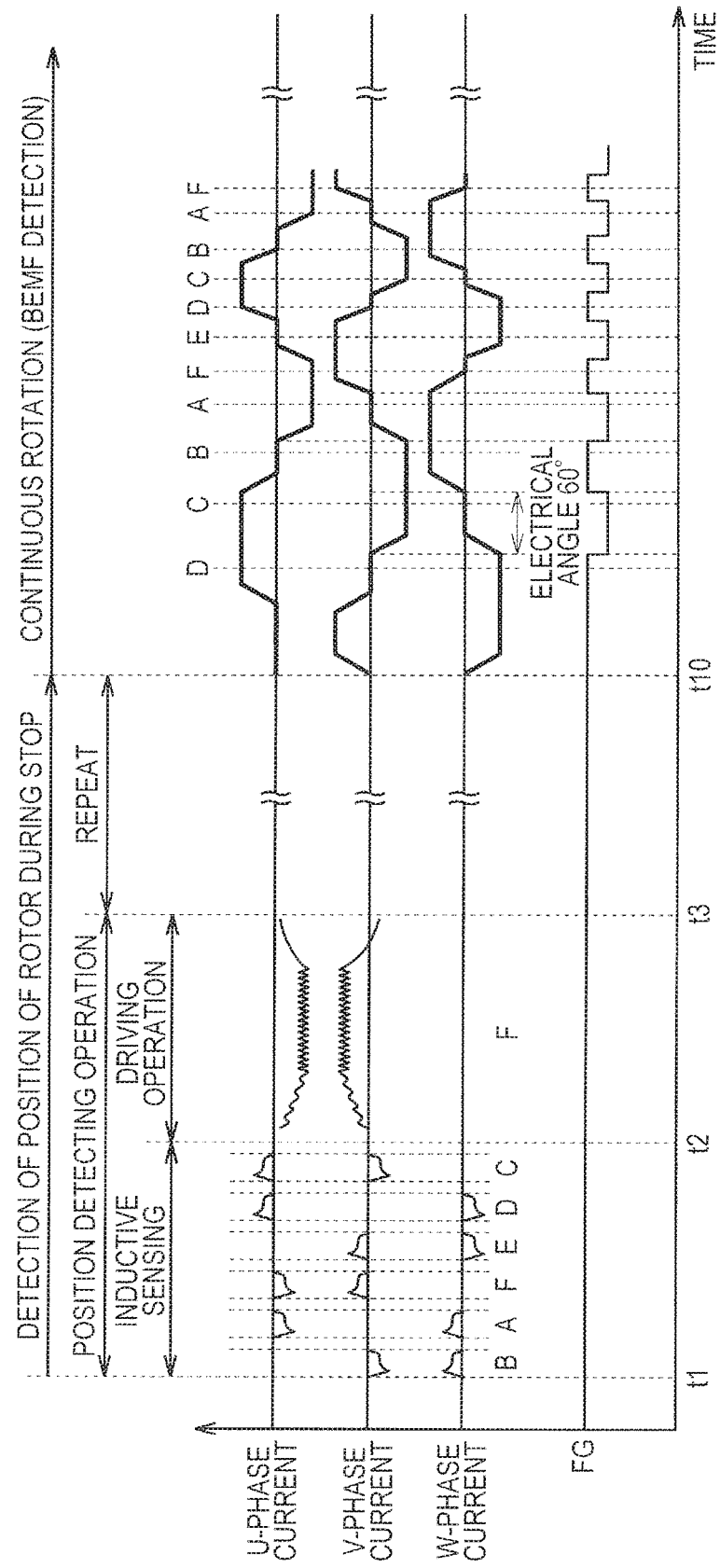
FIG. 6 is a timing chart schematically illustrating motor current waveforms.

FIG. 6 is a timing chart schematically illustrating motor current waveforms. In FIG. 6, current waveforms are schematically illustrated from detection of a position of a rotor of a brushless DC motor during stop until the brushless DC motor is continuously driven.

Referring to FIG. 6, from time t1 to time t2, detection of the position of the rotor during stop is performed (inductive sensing). Specifically, the MCU 110 in FIG. 1 applies a driving voltage to the brushless DC motor in each of the six conduction patterns described in FIGS. 2A to 2C and 3A to 3C for a short duration. Specifically, in the case of FIG. 6, the driving voltage is applied by the inverter circuit 120 to the brushless DC motor 130 in the order of the conduction patterns B, A, F, E, D, and C. The MCU 110 then detects a voltage difference between a voltage generated in a stator winding 131 of a non-conduction phase and a voltage generated at the virtual midpoint 162 by the differential amplifier circuit 140. The MCU 110 estimates a current position of the rotor based on the detected voltage difference.

In the next time period from the time t2 to time t3, the MCU 110 applies a voltage to the brushless DC motor 130 from the inverter circuit 120 based on the current estimated position of the rotor to cause generation of a torque in a desired rotation direction on the rotor (a driving operation). In the case of FIG. 6, a voltage is applied by the inverter circuit 120 to the brushless DC motor 130 in the conduction pattern F described in FIG. 3C. Assuming that the above-described inductive sensing (from the time t1 to the time t2) and the driving operation (from the time t2 to the time t3) form one position detecting operation, the MCU 110 repeats this position detecting operation (from the time t3 to time t10) until the brushless DC motor 130 continuously rotates.

After the time t10, the brushless DC motor 130 continuously rotates. In accordance with a conduction pattern during this continuous rotation, the MCU 110 detects a back electromotive force generated in the stator winding 131 of the non-conduction phase, thereby estimating the position of the rotor. As will be described in FIG. 7 and the subsequent drawings, a motor controlling semiconductor device of the present embodiment has a feature in a timing of detecting the back electromotive force.

Note that in the 120° conduction method, a conduction phase is switched every electrical angle 60°, as already described. An FG signal in FIG. 6 is a signal generated at a current switching timing. The conduction pattern is switched in the order of D, C, B, A, F, E, D, C, B, A, and F, and the rotor rotates in the reverse direction.

[Details of Motor Driving Control]

Figure 7:
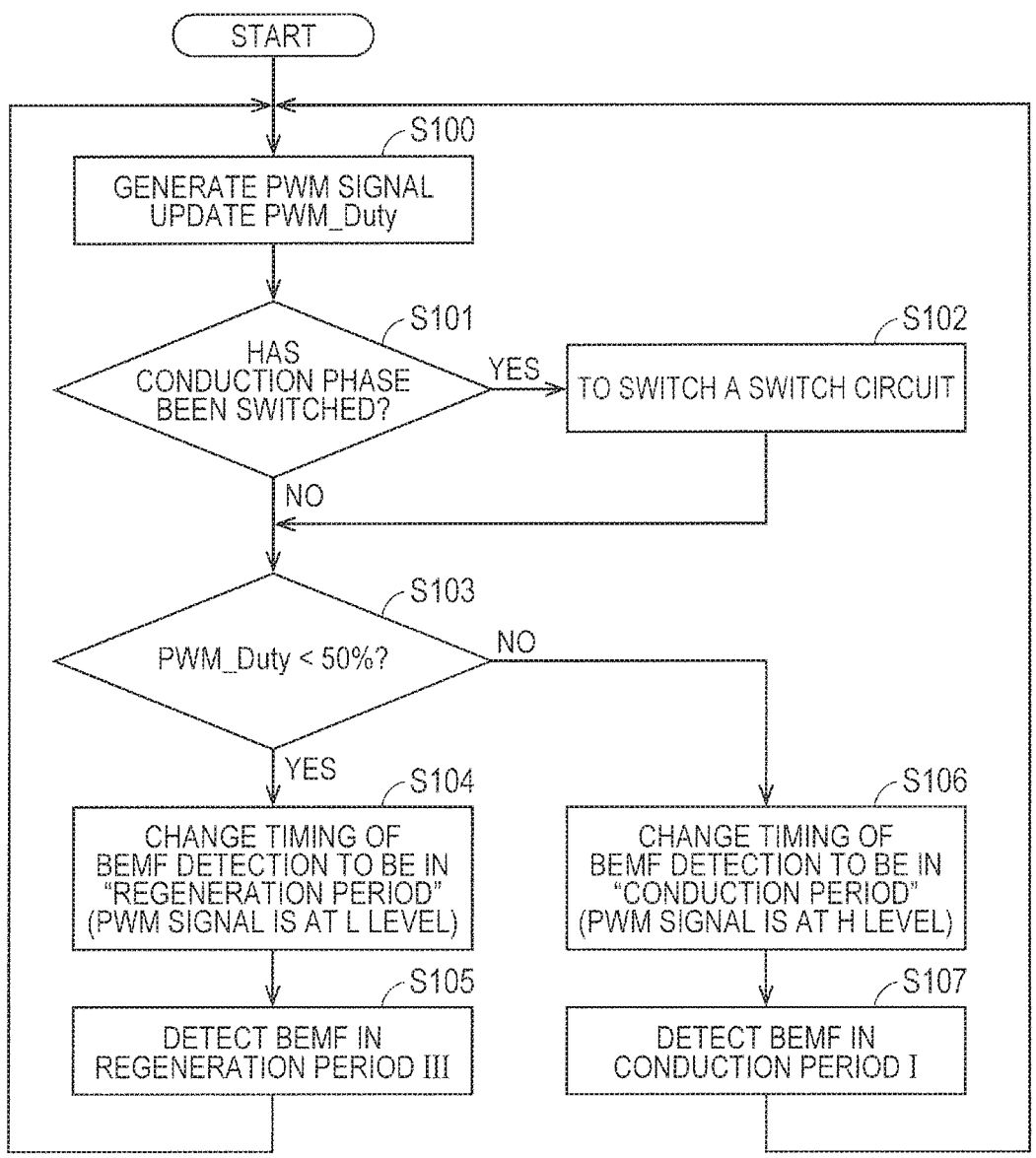
FIG. 7 is a flowchart illustrating a control procedure of a motor driving system according to a first embodiment.

FIG. 7 is a flowchart illustrating a control procedure of a motor driving system according to the first embodiment. The MCU 110 in FIG. 1 operates in accordance with a control program, thereby achieving steps described below.

Referring to FIGS. 1 and 7, the MCU 110 generates a PWM signal to be output to a gate of each semiconductor switching element configuring the inverter circuit 120, based on a current estimated position of a rotor, a detection value of a motor current, and a control command, such as a rotation speed command value 112. Thus, a duty ratio of the PWM signal PWM_Duty is updated (Step S100).

When having switched a conduction phase (YES in Step S101), the MCU 110 switches the switch circuit 150 to couple an output node of a non-conduction phase of the inverter circuit 120 to the detection node 151 (Step S102).

In the next step S103, the MCU 110 determines whether the duty ratio PWM_Duty is lower than a predetermined threshold value. Although the example of FIG. 7 illustrates a case where the threshold value is at a standard level, that is, 50%, the threshold value is not limited thereto. Note that the duty ratio PWM_Duty means a ratio of a conduction period in one cycle of a PWM signal, that is, the conduction period/(the conduction period+a regeneration period).

When the duty ratio PWM_Duty is less than the threshold value (YES in Step S103), the MCU 110 changes a detection timing of a back electromotive force (BEMF) to be in the "regeneration period" (Step S104). The MCU 110 then detects a back electromotive force generated in a stator winding of the non-conduction phase in the regeneration period (a regeneration period III in FIG. 9) (Step S105). In this manner, the BEMF is detected in the regeneration period that is longer than the conduction period in a case where the threshold value is 50%. Therefore, setting of the timing of BEMF detection is easy. Thereafter, the process returns to Step 100 and is repeated.

Returning to Step S103 in FIG. 7, a case where the duty ratio PWM_Duty is equal to or larger than the threshold value (NO in Step S103) is described. In this case, the MCU 110 changes the timing of BEMF detection to be in the "conduction period" (Step S106).

Figure 8:
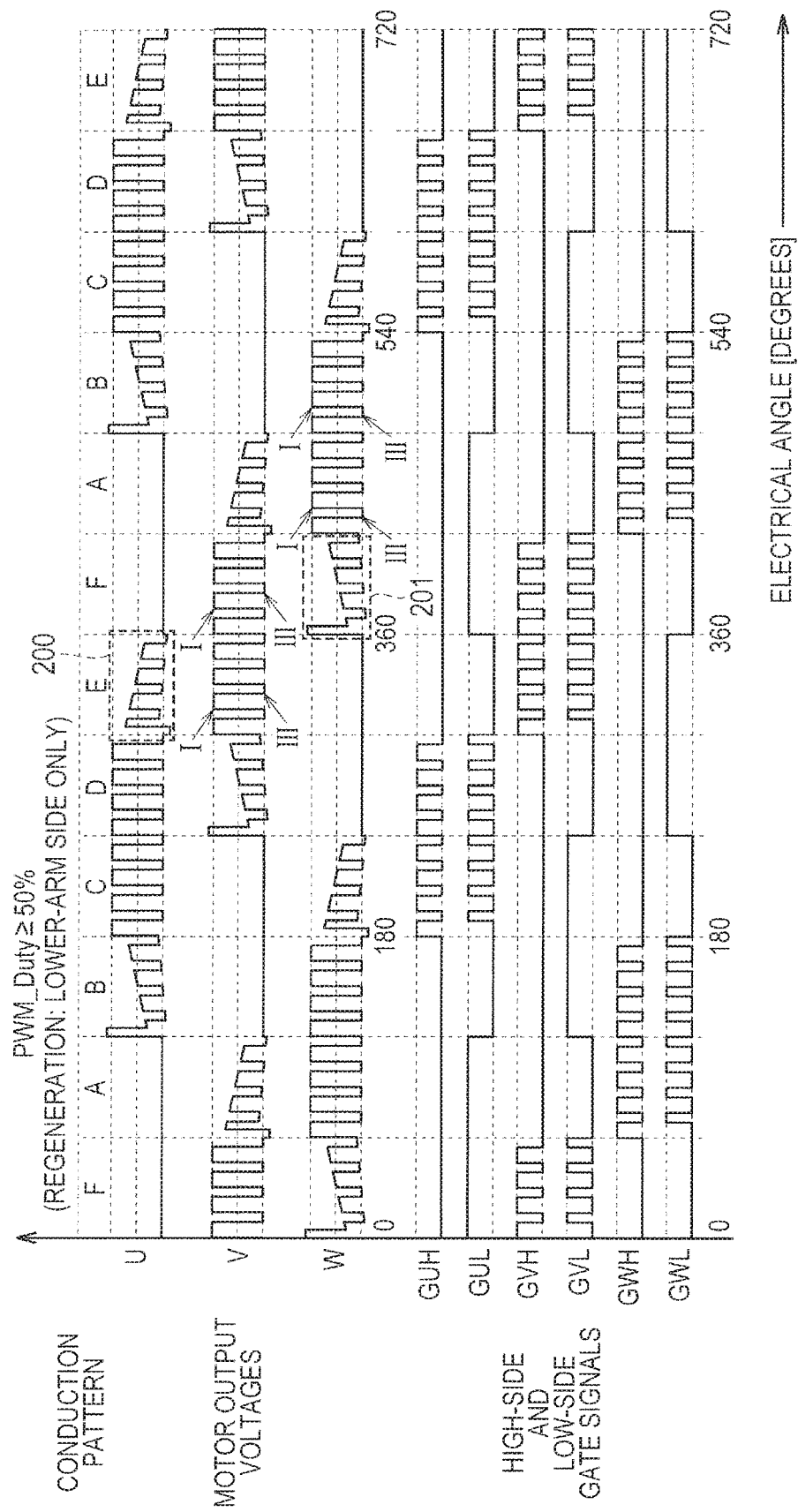
FIG. 8 schematically illustrates motor output voltage waveforms and waveforms of gate signals, when a duty ratio of a PWM signal is equal to or larger than a threshold value.

In the next step S107, the MCU 110 detects a back electromotive force generated in the stator winding of the non-conduction phase in the conduction period (a conduction period I in FIG. 8). In this manner, the BEMF is detected in the conduction period that is longer than the regeneration period in a case where the threshold value is 50%. Therefore, setting of the timing of BEMF detection is easy. Thereafter, the process returns to Step 100 and is repeated.

Here, supplemental description is provided for a logic level of a PWM signal in Steps S104 and S106 in FIG. 7. The "lower-arm regeneration mode" is used in the first embodiment. Specifically, a case is described in which an upper-arm semiconductor switching element of a first phase and a lower-arm semiconductor switching element of a second phase are controlled to be on in a conduction period of PWM control. In this case, in a lower-arm regeneration period, the MCU 110 controls the upper-arm semiconductor switching element of the first phase that is an upstream conduction phase to be off, and controls a lower-arm semiconductor switching element of the first phase to be on. The MCU 110 keeps the lower-arm semiconductor switching element of the second phase that is a downstream conduction phase on also in the lower-arm regeneration period.

Therefore, in the above-described case, it is possible to determine whether current time falls in the conduction period or the regeneration period based on the logic level of a PWM signal supplied to the gate of the upper-arm semiconductor switching element of the first phase that is the upstream conduction phase. The PWM signal supplied to the gate of the lower-arm semiconductor switching element of the first phase is a signal obtained by reversing the PWM signal supplied to the gate of the upper-arm semiconductor switching element of the first phase. Therefore, it is possible to determine whether current time falls in the conduction period or the regeneration period, also based on the logic level of the PWM signal supplied to the gate of the lower-arm semiconductor switching element of the first phase.

Specifically, in the above-described example, it is assumed that a semiconductor switching element is on when the logic level of a PWM signal is H level, and is off when the logic level of the PWM signal is L level. Then, the PWM signal supplied to the gate of the upper-arm semiconductor switching element of the first phase that is the upstream conduction phase is at H level in the conduction period (in Step S106), and is at L level in the regeneration period (in Step S104).

FIG. 8 schematically illustrates motor output voltage waveforms and waveforms of gate signals when a duty ratio of a PWM signal is equal to or larger than a threshold value.

FIG. 8 illustrates waveforms of output voltages output from the output nodes NU, NV, and NW of the U-phase, V-phase, and W-phase of the inverter circuit 120 to the brushless DC motor 130. Also, waveforms of PWM signals GUH, GUL, GVH, GVL, GWH, and GWL are also illustrated, which are output to gates of respective MOS transistors configuring the inverter circuit 120. The horizontal axis in FIG. 8 represents an electrical angle [degrees].

In FIG. 8, in a range of electrical range from 300° to 360°, the MCU 110 controls the inverter circuit 120 to drive the brushless DC motor 130 in the conduction pattern E described in FIG. 3B. Further, PWM control is carried out in a lower-arm regeneration mode.

In this case, on/off of the upper-arm and lower-arm MOS transistors VH and VL of the V-phase that is an upstream conduction phase is switched in accordance with the PWM signals GVH and GVL. Therefore, a voltage at the output node NV of the V-phase is also switched between H level and L level sequentially. The upper-arm MOS transistor WH of the W-phase that is a downstream conduction phase is controlled to be always off by the PWM signal GWH that is at L level, and the lower-arm MOS transistor WL of the W-phase is controlled to be always on by the PWM signal GWL that is at H level. Therefore, a voltage at the output node NW of the W-phase is equal to the ground voltage GND.

Meanwhile, the MOS transistors UH and UL of the U-phase that is a non-conduction phase are controlled to be always off by the PWM signals GUH and GUL that are at L level (Hi-Z). In this case, a back electromotive force causes generation of an induced voltage at the output node Nu of the U-phase. The U-phase induced voltage is alternately switched between H level and L level in accordance with a change of V-phase voltage. Each of H-level and L-level voltage values is gradually reduced.

The MCU 110 detects the induced voltage generated in the U-phase that is the non-conduction phase in the conduction period I of the V-phase. In the case of FIG. 8, the conduction period I is longer than the regeneration period III, and therefore setting of a timing of detecting a back electromotive force is easy.

In FIG. 8, in a range of electrical range from 360° degrees to 420°, the MCU 110 controls the inverter circuit 120 to drive the brushless DC motor 130 in the conduction pattern F described in FIG. 3C. Further, PWM control is carried out in the lower-arm regeneration mode.

In this case, on/off of the upper-arm and lower-arm MOS transistors VH and VL of the V-phase that is an upstream conduction phase is switched in accordance with the PWM signals GVH and GVL. Therefore, a voltage at the output node NV of the V-phase is also switched between H level and L level alternately. The upper-arm MOS transistor UH of the U-phase that is a downstream conduction phase is controlled to be always off by the PWM signal GUH that is at L level, and the lower-arm MOS transistor UL of the U-phase is controlled to be always on by the PWM signal GUL that is at H level. Therefore, a voltage at the output node NU of the U-phase is equal to the ground voltage GND.

Meanwhile, the MOS transistors WH and WL of the W-phase that is a non-conduction phase are controlled to be always off by the PWM signals GWH and GWL that are at L level (Hi-Z). In this case, a back electromotive force causes generation of an induced voltage at the output node NW of the W-phase. The W-phase induced voltage is alternately switched between H level and L level in accordance with a change of V-phase voltage. Each of H-level and L-level voltage values is gradually increased.

The MCU 110 detects the induced voltage generated in the W-phase that is the non-conduction phase in the conduction period I of the V-phase. In the case of FIG. 8, the conduction period I is longer than the regeneration period III, and therefore setting of a timing of detecting a back electromotive force is easy.

Figure 9:
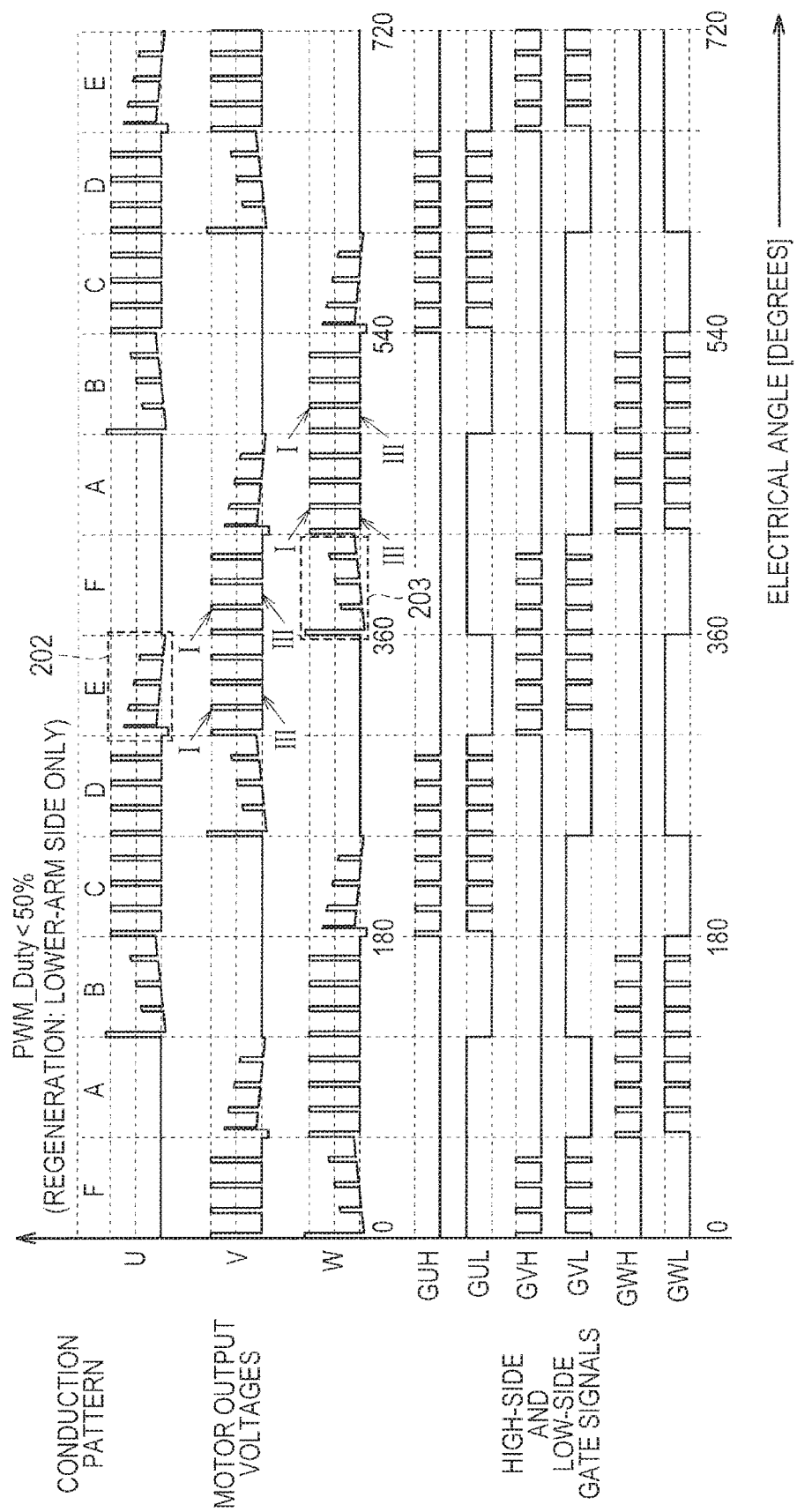
FIG. 9 schematically illustrates motor output voltage waveforms and waveforms of gate signals, when the duty ratio of the PWM signal is lower than the threshold value.

FIG. 9 schematically illustrates motor output voltage waveforms and waveforms of gate signals when a duty ratio of a PWM signal is less than a threshold value.

The timing chart of FIG. 9 corresponds to the timing chart of FIG. 8. However, because the duty ratio of the PWM signal PWM_Duty is different from that in the case of FIG. 8, a period in which a motor output voltage is at H level in accordance with a PWM signal and a period in which it is at L level are different from those in the case of FIG. 8. Other points in FIG. 9 are the same as those in the case of FIG. 8.

In a range of electrical angle from 300° to 360° in FIG. 9, the MCU 110 detects an induced voltage generated in the U-phase that is a non-conduction phase in the regeneration period III of the V-phase. In the case of FIG. 9, the regeneration period III is longer than the conduction period I, and therefore setting of a timing of detecting a back electromotive force is easy. In a range of electrical angle from 360° to 420° in FIG. 9, the MCU 110 detects an induced voltage generated in the W-phase that is the non-conduction phase in the regeneration period III of the V-phase. In the case of FIG. 8, the regeneration period III is longer than the conduction period I, and therefore setting of a timing of detecting a back electromotive force is easy.

Figure 10:
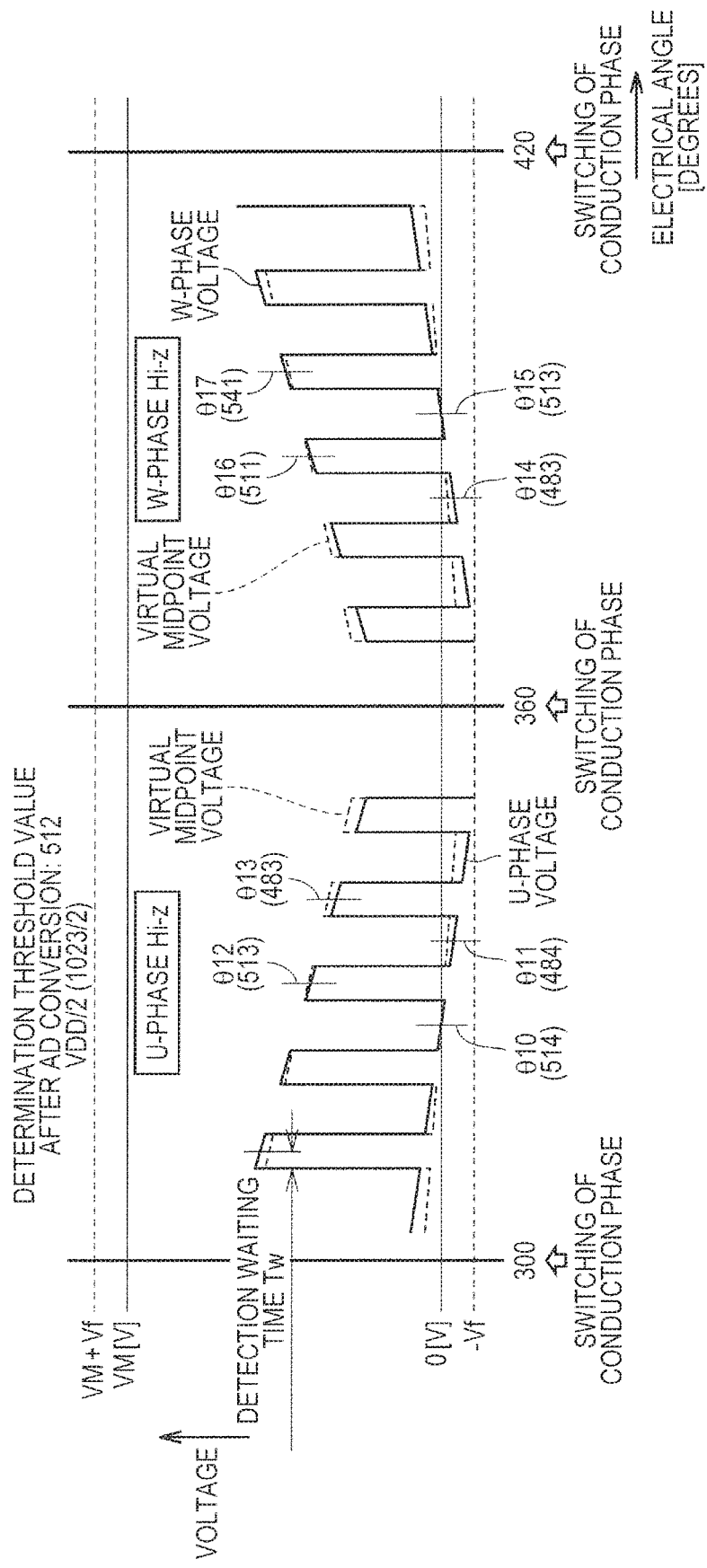
FIG. 10 illustrates a voltage waveform of a non-conduction phase in FIG. 9 in more detail.

FIG. 10 illustrates a voltage waveform of a non-conduction phase in FIG. 9 in more detail. For an electrical angle from 300° to 360°, a voltage waveform at the U-phase output node NU (202 in FIG. 9) is illustrated with solid line. For an electrical angle from 360° to 420°, a voltage waveform at the W-phase output node NW (203 in FIG. 9) is illustrated with solid line. Further, a voltage waveform at the virtual midpoint 162 is illustrated with broken line.

As illustrated in FIG. 10, a U-phase voltage, a W-phase voltage, and a midpoint voltage vary in a range from a voltage (−Vf) that is lower than the ground voltage GND by a forward voltage Vf of a body diode to a voltage (VM+Vf) that is higher than the power-supply voltage VM by the forward voltage Vf.

In a range of electrical angle of 300° to 360°, the voltage of the U-phase that is a non-conduction phase and the midpoint voltage are each switched between H level and L level alternately in accordance with a change of the voltage of the V-phase that is an upstream conduction phase. In this case, each of H-level and L-level voltage values is gradually reduced. However, a reduction rate of the U-phase voltage is larger than a reduction rate of the midpoint voltage. Thus, an intersection of both the reduction rates is generated, and it is possible to estimate a position of a rotor based on the position of this intersection.

Similarly, in a range of an electrical angle of 360° to 420°, the voltage of the W-phase that is a non-conduction phase and the midpoint voltage are each switched between H level and L level alternately in accordance with a change of the voltage of the V-phase that is an upstream conduction phase. In this case, each of H-level and L-level voltage values is gradually increased. However, an increase rate of the W-phase voltage is larger than an increase rate of the midpoint voltage. Therefore, an intersection of both the increase rates is generated, and it is possible to estimate the position of the rotor based on the position of this intersection.

The MCU 110 detects the U-phase voltage or the V-phase voltage and the midpoint voltage, when a detection waiting time Tw has passed after switching of PWM signal. Specifically, in a case where a duty ratio of a PWM signal is less than a threshold value in FIG. 10, the MCU 110 detects the U-phase voltage or the W-phase voltage and the midpoint voltage at electrical angles of θ10, θ11, θ14, and θ15 in a regeneration period. In FIG. 10, the regeneration period of a PWM signal is longer than a conduction period, and therefore setting of a timing of detecting a back electromotive force is easy.

In a case where the duty ratio of the PWM signal is equal to or larger than the threshold value, the MCU 110 detects the U-phase voltage or the W-phase voltage and the midpoint voltage at electrical angles of θ12, θ13, θ16, and θ17 in a conduction period. In this case, the conduction period becomes further longer, and therefore it is possible to set a timing of detecting a back electromotive force more easily in the conduction period than in the regeneration period.

In the circuit example illustrated in FIG. 1, the MCU 110 takes in a voltage value obtained by adding the offset voltage Vofst to a voltage difference between the U-phase voltage or the W-phase voltage and the midpoint voltage. A timing of taking in the voltage value is a time at which the detection waiting time Tw has passed after switching of PWM signal. When the offset voltage Vofst is set to VDD/2, a detection threshold value for detecting whether the U-phase voltage or the W-phase voltage and the midpoint voltage are equal to each other is VDD/2. In a case where a range from 0 [V] to the power-supply voltage VDD is converted to a digital value by a 10-bit AD converter, the above-described detection threshold value is 512. In FIG. 10, a value obtained by AD conversion is shown in parentheses.

[Modification of Timing of Detecting Back Electromotive Force]

In the example of FIG. 10, a timing of detecting a back electromotive force is set to a time at which the detection waiting time Tw has passed after switching of PWM signal. Using a carrier signal in generation of the PWM signal makes setting of an appropriate timing easier.

Figure 11:
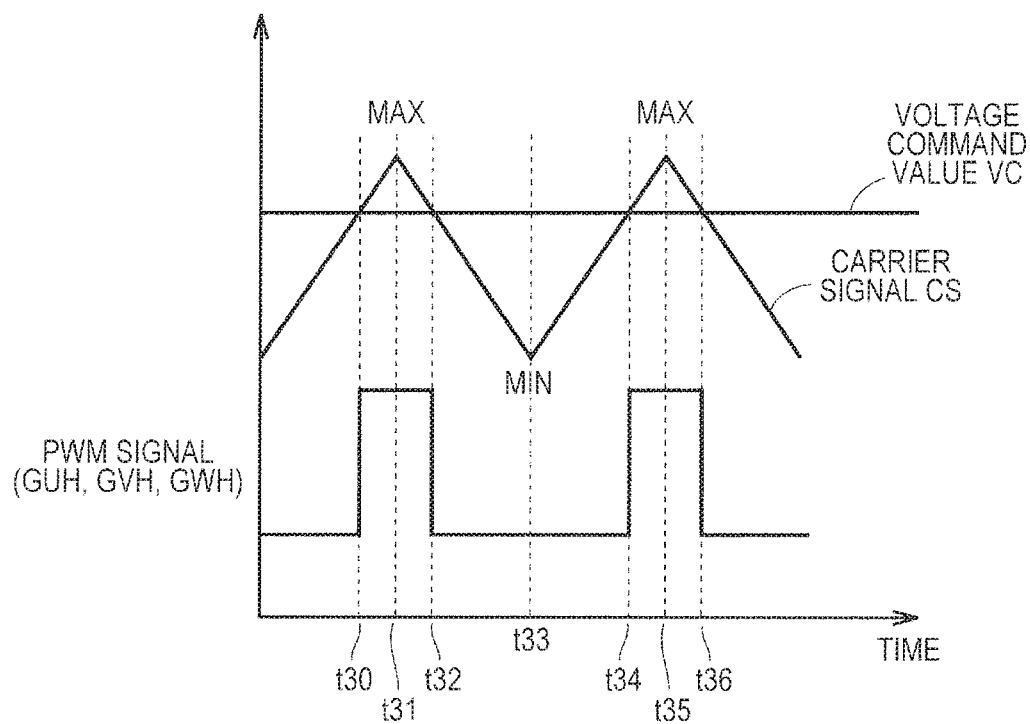
FIG. 11 illustrates an example of a method of determining a detection timing of a back electromotive force.

FIG. 11 illustrates an example of a method of determining a timing of detecting a back electromotive force. Referring to FIG. 11, the MCU 110 compares a voltage command value VC and a carrier signal CS when generating a PWM signal, and determines the level of the PWM signal, that is, H level or L level, based on the comparison result.

For example, a triangle wave is used as the carrier signal CS in the example of FIG. 11. In a section from time t30 to time t32 and a section from time t34 to time t36, the PWM signal is set at H level because the carrier signal CS is larger than the voltage command value VC. In other sections, the PWM signal is set at L level because the carrier signal CS is smaller than the voltage command value VC.

In FIG. 11, each of time t31 and time t35 at which the carrier signal CS takes the maximum value MAX is the center of the section in which the PWM signal is at H level. Time t33 at which the carrier signal CS takes the minimum value MIN is the center of the section in which the PWM signal is at L level (that is, the section from the t32 to the t34). Therefore, by setting a time at which the carrier signal CS takes the maximum value or the minimum value as a timing of detecting a back electromotive force, it is possible to detect the back electromotive force at an appropriate timing.

[Advantageous Effect]

As described above, according to the first embodiment, a back electromotive force generated in a non-conduction phase is detected in a regeneration period of a PWM signal, in which current is made to flow to a three-phase motor on a regeneration path, when a duty ratio of the PWM signal output to an inverter circuit for driving the three-phase motor is less than a threshold value. Therefore, it is possible to surely detect the back electromotive force generated in the non-conduction phase even at an extremely low duty ratio.

Second Embodiment

In motors used for electric tools, for example, both an upper-arm regeneration mode and a lower-arm regeneration mode are used for distributing heat generated in a MOS transistor configuring an inverter circuit to make a life of the MOS transistor uniform. For example, in a 120° conduction method, the upper-arm regeneration mode and the lower-arm regeneration mode are switched when a conduction pattern is switched every electrical angle of 60°.

In a second embodiment, a case is described in which both upper-arm regeneration and lower-arm regeneration are used in a case of making current flow on a regeneration path in PWM control as described above. Since the general configuration of the motor driving system 90 described referring to FIG. 1 in the first embodiment is common also to the second embodiment, the description is not repeated.

[Control Procedure of Motor Driving System]

Figure 12:
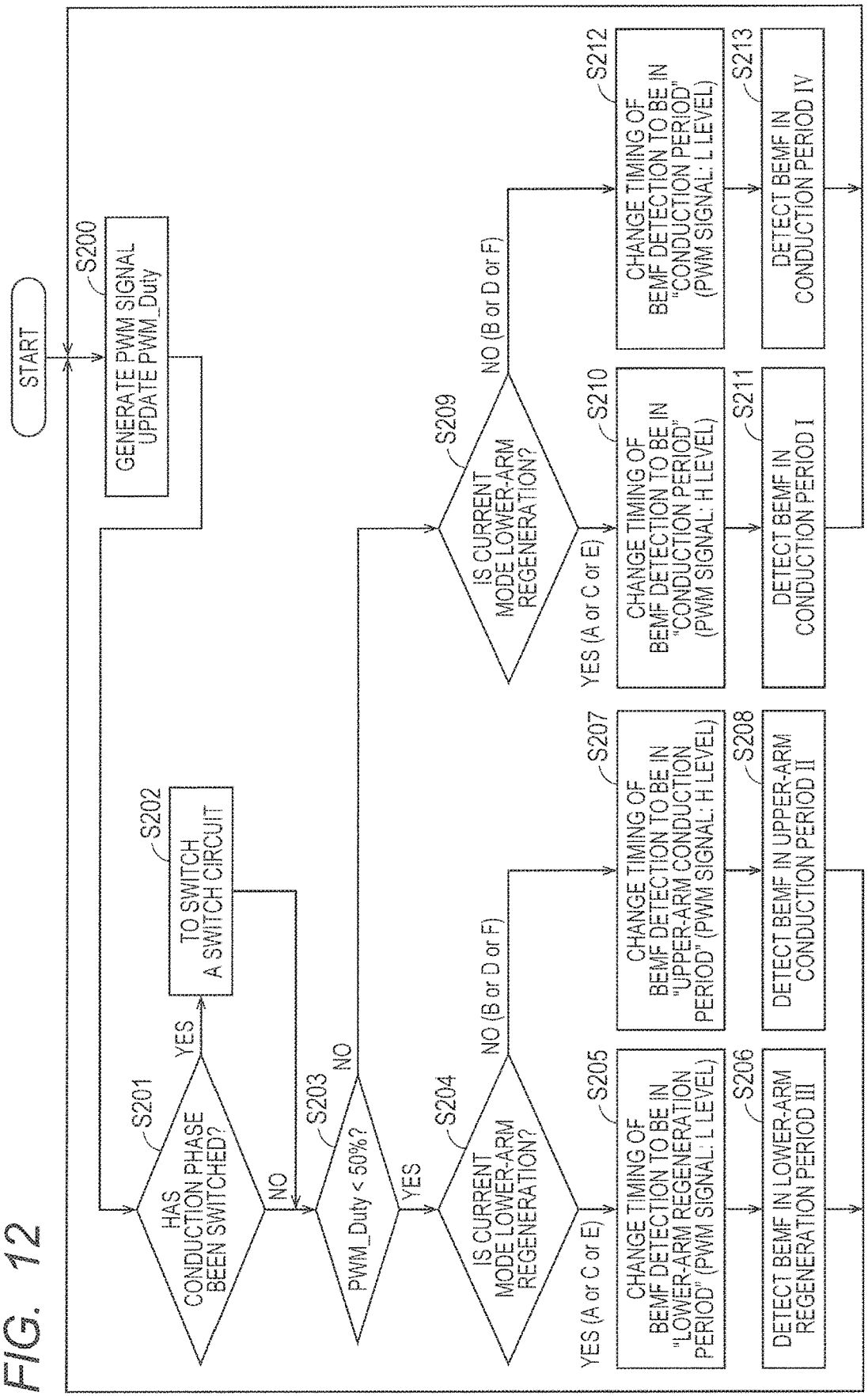
FIG. 12 is a flowchart illustrating a control procedure of a motor driving system according to a second embodiment.

FIG. 12 is a flowchart illustrating a control procedure of a motor driving system according to the second embodiment. The MCU 110 in FIG. 1 operates in accordance with a control program, thereby achieving steps described below.

Referring to FIGS. 1 and 12, the MCU 110 generates a PWM signal to be output to a gate of each semiconductor switching element configuring the inverter circuit 120, based on a current estimated position of a rotor, a detection value of a motor current, and a control command, such as a rotation speed command value 112. Thus, a duty ratio of the PWM signal PWM_Duty is updated (Step S200).

When having switched a conduction phase (YES in Step S201), the MCU 110 switches the switch circuit 150 to couple an output node of a non-conduction phase of the inverter circuit 120 to the detection node 151 (Step S202).

The following control procedure is switched based on whether the duty ratio PWM_Duty is less than a threshold value (Step S203) and whether a current mode is a lower-arm regeneration mode (Steps S203 and S208).

In FIG. 12, a case where the threshold value is 50% is illustrated as an example. However, the threshold value is not limited thereto. Further, FIG. 12 illustrates an example where PWM control is performed by lower-arm regeneration in any of the conduction patterns A, C, and E, and is performed by upper-arm regeneration in any of the conduction patterns B, D, and F. However, it is not limited to this example how to apply lower-arm regeneration and upper-arm regeneration.

(1. PWM_Duty<50% and Lower-Arm Regeneration)

When the duty ratio PWM_Duty is less than the threshold value and PWM control is performed by lower-arm regeneration (YES in Step S203 and YES in Step S204), the MCU 110 changes a detection timing of a back electromotive force (BEMF) to be in a "lower-arm regeneration period" (Step S205). The MCU 110 then detects a back electromotive force generated in a stator winding of a non-conduction phase in the lower-arm regeneration period (a regeneration period III in FIG. 14) (Step S206). Thereafter, the process returns to Step 200 and is repeated.

(2. PWM_Duty<50% and Upper-Arm Regeneration)

When the duty ratio PWM_Duty is less than the threshold value and PWM control is performed by upper-arm regeneration (YES in Step S203 and NO in Step S204), the MCU 110 changes a detection timing of a back electromotive force (BEMF) to be in an "upper-arm regeneration period" (Step S207). The MCU 110 then detects a back electromotive force generated in the stator winding of the non-conduction phase in the upper-arm regeneration period (a regeneration period II in FIG. 14) (Step S206). Thereafter, the process returns to Step 200 and is repeated.

Now a difference between the "upper-arm regeneration mode" and the "lower-arm regeneration mode" is further described. For example, a case is described in which an upper-arm semiconductor switching element of a first phase and a lower-arm semiconductor switching element of a second phase are controlled to be on in a conduction period of PWM control. In this case, in a lower-arm regeneration period, the MCU 110 controls the upper-arm semiconductor switching element of the first phase that is an upstream conduction phase to be off, and controls a lower-arm semiconductor switching element of the first phase to be on. The MCU 110 controls the lower-arm semiconductor switching element of the second phase that is a downstream conduction phase on, also in the lower-arm regeneration period. Meanwhile, in an upper-arm regeneration period, the MCU 110 controls the lower-arm semiconductor switching element of the second phase that is the downstream conduction phase to be off, and controls an upper-arm semiconductor switching element of the second phase to be on. The MCU 110 controls the upper-arm semiconductor switching element of the first phase that is the upstream conduction phase on, also in the upper-arm regeneration period.

Therefore, in a case of lower-arm regeneration in the above-described example, the conduction period and the regeneration period are alternately switched by a PWM signal supplied to the gate of the upper-arm or lower-arm semiconductor switching element of the first phase that is the upstream conduction phase. Thus, it is possible to determine a timing of detecting a back electromotive force based on the PWM signal for the upstream conduction phase. In a case of upper-arm regeneration, the conduction period and the regeneration period are switched by a PWM signal supplied to the gate of the upper-arm or lower-arm semiconductor switching element of the second phase that is the downstream conduction phase. Thus, it is possible to determine the timing of detecting a back electromotive force based on the PWM signal for the downstream conduction phase.

Specifically, in the above-described example, it is assumed that a semiconductor switching element is on when the voltage level of a PWM signal is at H level, and is off when the voltage level of the PWM signal is at L level. Then, in a case of performing PWM control in the lower-arm regeneration mode, the PWM signal supplied to the gate of the upper-arm switching element of the first phase that is the upstream conduction phase is at H level in the conduction period (in Step S210), and is at L level in the lower-arm regeneration period (in Step S205). On the other hand, in a case of performing PWM control in the upper-arm regeneration mode, the PWM signal supplied to the gate of the upper-arm switching element of the second phase that is the downstream conduction phase is at L level in the conduction period (in Step S212), and is at H level in the regeneration period (in Step S207).

(3. PWM_Duty≥50% and Lower-Arm Regeneration)

When the duty ratio PWM_Duty is equal to or larger than the threshold value and PWM control is performed in the lower-arm regeneration mode (NO in Step S203 and YES in Step S209), the MCU 110 changes a detection timing of a back electromotive force (BEMF) to be in the "conduction period" (Step S210). This "conduction period" corresponds to a case where the PWM signal supplied to the gate of the upper-arm semiconductor switching element of the first phase that is the upstream conduction phase is at H level in the aforementioned example. The MCU 110 then detects a back electromotive force generated in a stator winding of a non-conduction phase in the conduction period (the conduction period I in FIG. 13) (Step S211). Thereafter, the process returns to Step 200 and is repeated.

(4. PWM_≥Duty 50% and Upper-Arm Regeneration)

When the duty ratio PWM_Duty is equal to or larger than the threshold value and PWM control is performed by upper-arm regeneration (NO in Step S203 and NO in Step S209), the MCU 110 changes the detection timing of a back electromotive force (BEMF) to be in the "conduction period" (Step S212). This "conduction period" corresponds to a case where the PWM signal supplied to the gate of the upper-arm semiconductor switching element of the second phase that is the downstream conduction phase is at L level in the aforementioned example. The MCU 110 then detects a back electromotive force generated in the stator winding of the non-conduction phase in the conduction period (a conduction period IV in FIG. 13) (Step S213). Thereafter, the process returns to Step 200 and is repeated.

[Specific Example of Motor Output Voltage Waveforms and Waveforms of Gate Signals]

Figure 13:
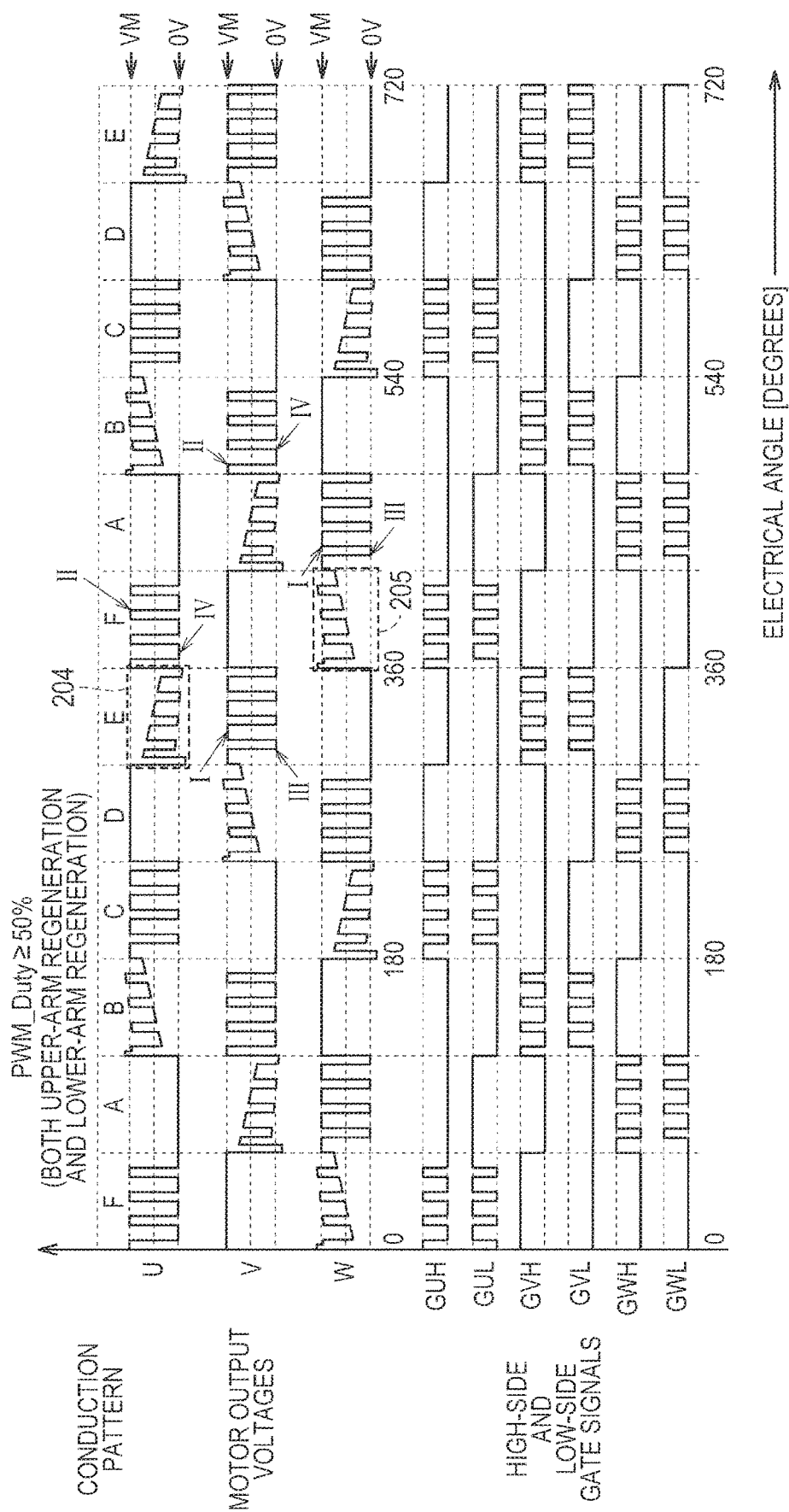
FIG. 13 schematically illustrates motor output voltage waveforms and waveforms of gate signals in the motor driving system according to the second embodiment, when a duty ratio of a PWM signal is equal to or larger than a threshold value.

FIG. 13 schematically illustrates motor output voltage waveforms and waveforms of gate signals in the motor driving system according to the second embodiment, when a duty ratio of a PWM signal is equal to or larger than a threshold value.

FIG. 13 illustrates waveforms of output voltages output from the output nodes NU, NV, and NW of the U-phase, V-phase, and W-phase of the inverter circuit 120 to the brushless DC motor 130. Also, waveforms of PWM signals GUH, GUL, GVH, GVL, GWH, and GWL are also illustrated, which are output to gates of respective MOS transistor configuring the inverter circuit 120. The horizontal axis in FIG. 13 represents an electrical angle [degrees].

Further, FIG. 13 illustrates the conduction patterns described referring to FIGS. 2A to 2C and 3A to 3C. In the motor driving system of the second embodiment, a 120° conduction method is employed, and upper-arm regeneration and lower-arm regeneration are switched at a time of switching of a conduction phase. Specifically, in the case of FIG. 13, the inverter circuit 120 is PWM-controlled by using a lower-arm regeneration mode in the conduction patterns A, C, and E, and is PWM-controlled by using an upper-arm regeneration mode in the conduction patterns B, D, and F.

In FIG. 13, in a range of electrical range from 300° to 360°, the MCU 110 controls the inverter circuit 120 to drive the brushless DC motor 130 in the conduction pattern E described in FIG. 3B. Further, PWM control is carried out in the lower-arm regeneration mode. Thus, waveforms in this case are the same as those in a range of electrical angle from 300° to 360° in FIG. 8, and therefore the detailed description is not repeated.

In FIG. 13, in a range of electrical range from 360° to 420°, the MCU 110 controls the inverter circuit 120 to drive the brushless DC motor 130 in the conduction pattern F described in FIG. 3C. Further, PWM control is carried out in the upper-arm regeneration mode.

In this case, on/off of the upper-arm and lower-arm MOS transistors UH and UL of the U-phase that is a downstream conduction phase is switched in accordance with the PWM signals GUH and GUL. Therefore, a voltage at the output node NU of the U-phase is also switched between H level and L level alternately. The upper-arm MOS transistor VH of the V-phase that is an upstream conduction phase is controlled to be always on by the PWM signal GVH that is at H level, and the lower-arm MOS transistor VL of the V-phase is controlled to be always off by the PWM signal GVL that is at L level. Therefore, a voltage at the output node NV of the V-phase is equal to the power-supply voltage VM.

Meanwhile, the MOS transistors WH and WL of the W-phase that is a non-conduction phase are controlled to be always off by the PWM signals GWH and GWL that are at L level (Hi-Z). In this case, a back electromotive force causes generation of an induced voltage at the output node NW of the W-phase. The induced voltage of the W-phase is alternately switched between H level and L level in accordance with a change of U-phase voltage. Each of H-level and L-level voltage values is gradually increased.

The MCU 110 detects the induced voltage generated in the W-phase that is the non-conduction phase in a conduction period IV of the U-phase. In the case of FIG. 13, the conduction period IV is longer than the regeneration period II, and therefore setting of a timing of detecting a back electromotive force is easy.

Figure 14:
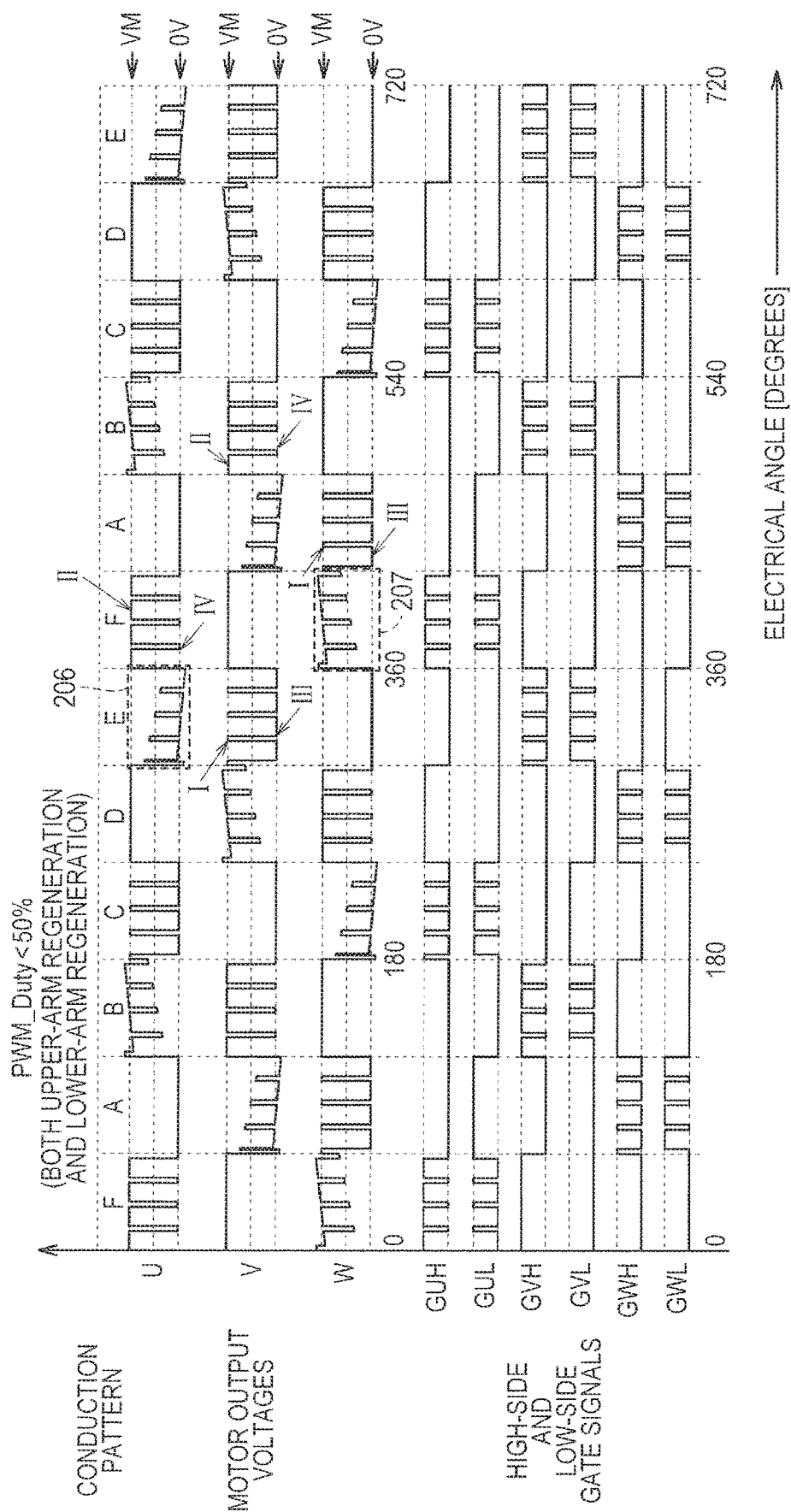
FIG. 14 schematically illustrates motor output voltage waveforms and waveforms of gate signals in the motor driving system according to the second embodiment, when the duty ratio of the PWM signal is lower than the threshold value.

FIG. 14 schematically illustrates motor output voltage waveforms and waveforms of gate signals in the motor driving system according to the second embodiment, when a duty ratio of a PWM signal is less than a threshold value.

The timing chart of FIG. 14 corresponds to the timing chart of FIG. 13. However, because the duty ratio of the PWM signal PWM_Duty is different from that in the case of FIG. 13, a period during which a motor output voltage is at H level in accordance with the PWM signal and a period during which it is at L level are different from those in the case of FIG. 13. Other points in FIG. 14 are the same as those in the case of FIG. 13.

In a range of electrical angle from 300° to 360° in FIG. 14, the MCU 110 detects an induced voltage generated in the U-phase that is a non-conduction phase in the regeneration period III of the V-phase. In the case of FIG. 14, the regeneration period III is longer than the conduction period I, and therefore setting of a timing of detecting a back electromotive force is easy. In a range of electrical angle from 360° to 420° in FIG. 14, the MCU 110 detects an induced voltage generated in the W-phase that is a non-conduction phase in a regeneration period II of the U-phase. In the case of FIG. 14, the regeneration period II is longer than the conduction period IV, and therefore setting of a timing of detecting a back electromotive force is easy.

Figure 15:
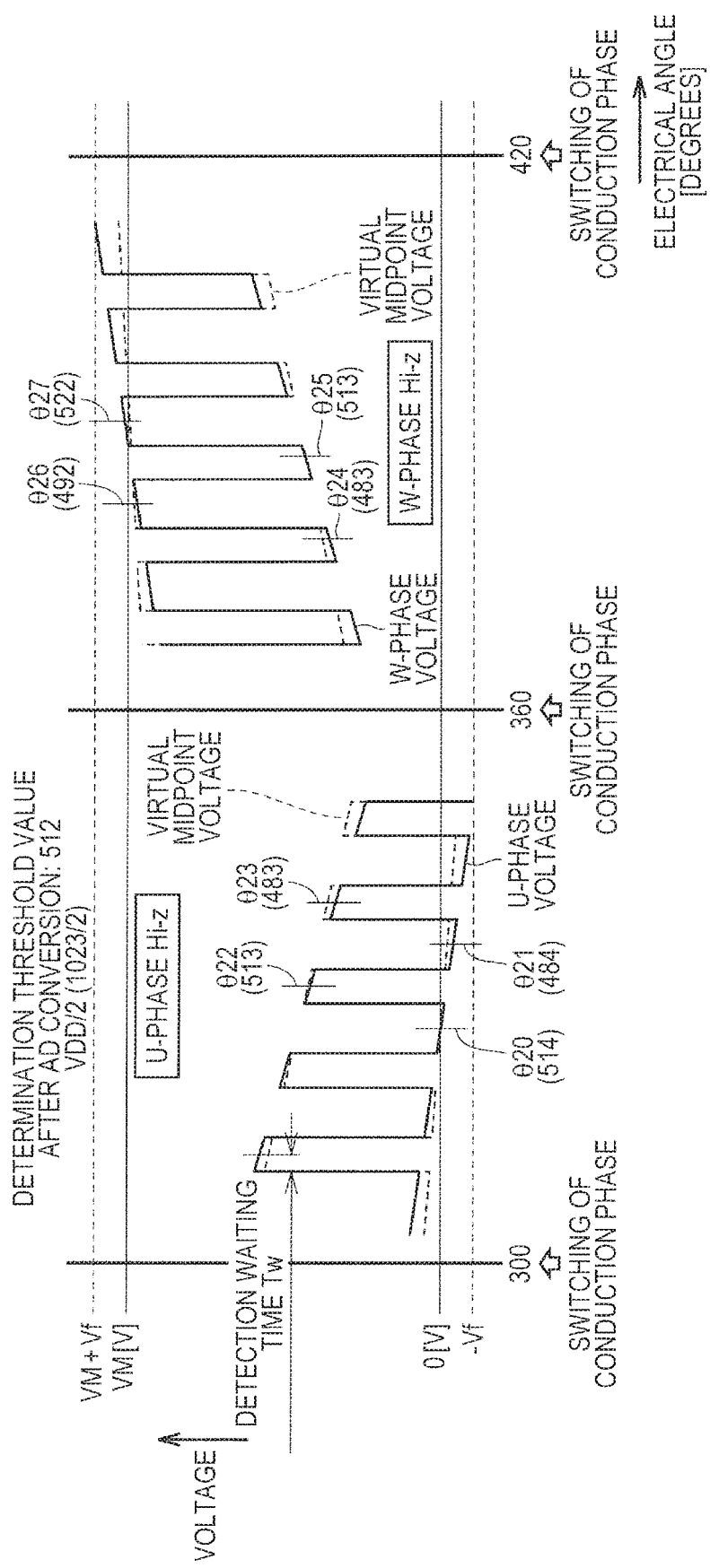
FIG. 15 illustrates a voltage waveform of a non-conduction phase in FIG. 14 in more detail.

FIG. 15 illustrates a voltage waveform in a non-conduction phase in FIG. 14 in more detail. For an electrical angle from 300° to 360°, a voltage waveform at the U-phase output node NU (206 in FIG. 14) is illustrated with solid line. For an electrical angle from 360° to 420°, a voltage waveform at the W-phase output node NW (207 in FIG. 14) is illustrated with solid line. Further, a voltage waveform at the virtual midpoint 162 is illustrated with broken line.

As illustrated in FIG. 15, a U-phase voltage, a W-phase voltage, and a midpoint voltage vary in a range from a voltage (−Vf) that is lower than the ground voltage GND by the forward voltage Vf of a body diode to a voltage (VM+Vf) that is higher than the power-supply voltage VM by the forward voltage Vf.

In a range of electrical angle from 300° to 360°, the U-phase voltage and the midpoint voltage are each switched between H level and L level alternately in accordance with a change of the voltage of the V-phase that is an upstream conduction phase. In this case, each of H-level and L-level voltage values is gradually reduced. However, a reduction rate of the U-phase voltage is larger than a reduction rate of the midpoint voltage. Therefore, an intersection of both the reduction rates is generated, and it is possible to estimate a position of a rotor based on the position of this intersection.

Similarly, in a range of an electrical angle from 360° to 420°, the W-phase voltage and the midpoint voltage are alternately switched between H level and L level in accordance with a change of the voltage of the U-phase that is the downstream conduction phase. In this case, each of H-level and L-level voltage values is gradually increased. However, an increase rate of the W-phase voltage is larger than an increase rate of the midpoint voltage. Therefore, an intersection of both the increase rates is generated, and it is possible to estimate the position of the rotor based on the position of this intersection.

The MCU 110 detects the U-phase voltage or the W-phase voltage and the midpoint voltage, when the detection waiting time Tw has passed after switching of PWM signal. Specifically, in a case where a duty ratio of a PWM signal is lower than a threshold value in FIG. 15, the MCU 110 detects the U-phase voltage or the W-phase voltage and the midpoint voltage at electrical angles of θ20, θ21, θ26, and θ27 in a regeneration period. In FIG. 15, the regeneration period of a PWM signal is longer than a conduction period, and therefore setting of a timing of detecting a back electromotive force is easy.

In a case where the duty ratio of the PWM signal is equal to or larger than the threshold value, the MCU 110 detects the U-phase voltage or the W-phase voltage and the midpoint voltage at electrical angles of θ22, θ23, θ24, and θ25 in the conduction period. In this case, the conduction period becomes further longer, and therefore it is possible to set a timing of detecting a back electromotive force more easily in the conduction period than in the regeneration period.

In the circuit example illustrated in FIG. 1, the MCU 110 takes in a voltage value obtained by adding the offset voltage Vofst to a voltage difference between the U-phase voltage or the W-phase voltage and the midpoint voltage. A timing of taking in the voltage value is a time at which the detection waiting time Tw has passed after switching of PWM signal. When the offset voltage Vofst is set to VDD/2, a detection threshold value for detecting whether the U-phase voltage or the W-phase voltage and the midpoint voltage are equal to each other is VDD/2. In a case where a range from 0 [V] to the power-supply voltage VDD is converted to a digital value by a 10-bit AD converter, the above-described detection threshold value is 512. In FIG. 15, a value obtained by AD conversion is shown in parentheses.

[Advantageous Effect]

According to the second embodiment, a timing of detecting a back electromotive force generated in a non-conduction phase is determined based on a PWM signal of a downstream conduction phase in an upper-arm regeneration mode, while that timing is determined based on a PWM signal of an upstream conduction phase in a lower-arm regeneration mode. Therefore, even in a case where the upper-arm regeneration mode and the lower-arm regeneration mode are performed alternately, similar control to that in the first embodiment can be performed, so that it is possible to stably control a three-phase motor in a senseless manner even at an extremely low duty ratio.

In the above, the invention made by the inventors of the present application has been specifically described by way of the embodiments. However, it is naturally understood that the present invention is not limited to the aforementioned embodiments, and can be changed in various ways within the scope not departing from the gist thereof.

What is claimed is:

1. A semiconductor device for controlling an inverter circuit for driving a three-phase motor, comprising:
   a detector, coupled to output nodes of respective phases of the inverter circuit for outputting motor voltages, to detect a voltage at one of the output nodes of the respective phases, which corresponds to a non-conduction phase; and
   a controller to compare the voltage at the output node of the non-conduction phase and a reference voltage with each other to estimate a position of a rotor of the three-phase motor, and to generate a pulse width modulation signal for controlling the inverter circuit based on the estimated position of the rotor,
   wherein the controller detects the voltage at the output node of the non-conduction phase in a regeneration period of the pulse width modulation signal when a duty ratio of the pulse width modulation signal is less than a threshold value, the regeneration period being a period in which a current is made to flow to the three-phase motor on a regeneration path.

2. The semiconductor device according to claim 1,
   wherein the controller detects the voltage at the output node of the non-conduction phase in a conduction period of the pulse width modulation signal when the duty ratio of the pulse width modulation signal is equal to or larger than the threshold value, the conduction period being a period in which the current is made to flow to the three-phase motor on a conduction path.

3. The semiconductor device according to claim 1,
   wherein the three-phase motor includes stator windings in Y-connection, and
   wherein the reference voltage is a voltage at a midpoint that is a node of the stator windings.

4. The semiconductor device according to claim 1, further comprising a virtual midpoint coupled to the output nodes of the respective phases via resistor elements,
   wherein the reference voltage is a voltage at the virtual midpoint.

5. The semiconductor device according to claim 1,
   wherein the detector includes a switch circuit that selects one of the output nodes of the respective phases in accordance with a command from the controller.

6. The semiconductor device according to claim 5,
   wherein the detector further includes a differential amplifier that amplifies a difference between a voltage at an output node selected by the switch circuit and the reference voltage.

7. The semiconductor device according to claim 2,
   wherein the controller has
   a first control mode in which the current is made to flow to an upper-arm semiconductor switching element of the inverter circuit on the regeneration path in the regeneration period, and
   a second control mode in which the current is made to flow to a lower-arm semiconductor switching element of the inverter circuit on the regeneration path in the regeneration period.

8. The semiconductor device according to claim 7,
   wherein the controller controls the inverter circuit in the regeneration circuit by either one of the first control mode and the second control mode.

9. The semiconductor device according to claim 7,
   wherein the controller switches the first control mode and the second control mode every time a conduction phase of the three-phase is switched.

10. The semiconductor device according to claim 7,
    wherein in a case where the controller controls an upper-arm semiconductor switching element of a first phase to be on and controls a lower-arm semiconductor switching element of a second phase to be on in the conduction period, and a current control mode is the first control mode, the controller determines a timing of detection of the voltage at the output node of the non-conduction phase based on a pulse width modulation signal that controls on/off of the semiconductor switching element of the second phase.

11. The semiconductor device according to claim 7,
    wherein in a case where the controller controls an upper-arm semiconductor switching element of a first phase to be on and controls a lower-arm semiconductor switching element of a second phase to be on in the conduction period, and a current control mode is the second control mode, the controller determines a timing of detection of the voltage at the output node of the non-conduction phase based on a pulse width modulation signal that controls on/off of the semiconductor switching element of the first phase.

12. A motor driving system comprising:
    a three-phase motor;
    an inverter circuit to drive the three-phase motor; and
    a semiconductor device to control the inverter circuit,
    wherein the semiconductor device includes
    a detector, coupled to output nodes of respective phases of the inverter circuit for outputting motor voltages, to detect a voltage at one of the output nodes of the respective phases, which corresponds to a non-conduction phase, and
    a controller to compare the voltage at the output node of the non-conduction phase and a reference voltage with each other to estimate a position of a rotor of the three-phase motor, and to generate a pulse width modulation signal for controlling the inverter circuit based on the estimated position of the rotor, and
    wherein the controller detects the voltage at the output node of the non-conduction phase in a regeneration period of the pulse width modulation signal when a duty ratio of the pulse width modulation signal is less than a threshold value, the regeneration period being a period in which a current is made to flow to the three-phase motor on a regeneration path.

13. A motor control program for causing a computer to execute:
    determining whether a duty ratio of a pulse width modulation signal for controlling an inverter circuit for driving a three-phase motor is less than a threshold value;
    detecting a back electromotive force generated in a stator winding of a non-conduction phase of the three-phase motor in a regeneration period of the pulse width modulation signal when the duty ratio of the pulse width modulation signal is less than the threshold value, the regeneration period being a period in which a current is made to flow on a regeneration path to the three-phase motor, and comparing the detected back electromotive force and a reference voltage with each other to estimate a position of a rotor of the three-phase motor, and generating the pulse width modulation signal based on the estimated position of the rotor.

14. The motor control program according to claim 13, wherein the detecting detects the back electromotive force in a conduction period of the pulse width modulation signal when the duty ratio of the pulse width modulation signal is equal to or larger than the threshold value, the conduction period being a period in which the current is made to flow on a conduction path to the three-phase motor.

15. The motor control program according to claim 14, further comprising switching a first control mode and s second control mode at switching of a conduction phase of the three-phase motor, wherein in the first control mode, the pulse width modulation signal is generated to make the current flow to an upper-arm semiconductor switching element of the inverter circuit on the regeneration path in the regeneration mode, and wherein in the second control mode, the pulse width modulation signal is generated to make the current flow to a lower-arm semiconductor switching element of the inverter circuit on the regeneration path in the regeneration mode.

* * * * *